(12) United States Patent
Kaneda et al.

(10) Patent No.: US 12,229,350 B2
(45) Date of Patent: Feb. 18, 2025

(54) ELECTRONIC PEN

(71) Applicant: Wacom Co., Ltd., Saitama (JP)

(72) Inventors: Takenori Kaneda, Tochigi (JP);
Kenichi Ninomiya, Kanagawa (JP);
Takayuki Arai, Saitama (JP); Kohei Tanaka, Tokyo (JP); Ryuto Sakamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 69 days.

(21) Appl. No.: 17/534,285

(22) Filed: Nov. 23, 2021

(65) Prior Publication Data

US 2022/0100291 A1  Mar. 31, 2022

Related U.S. Application Data

(63) Continuation of application No. 16/046,941, filed on Jul. 26, 2018, now Pat. No. 11,216,088, which is a
(Continued)

(30) Foreign Application Priority Data

Feb. 1, 2016  (JP) .................................. 2016016914

(51) Int. Cl.
*G06F 3/0354* (2013.01)
*G06F 3/038* (2013.01)
(Continued)

(52) U.S. Cl.
CPC ........ *G06F 3/03545* (2013.01); *G06F 3/0383* (2013.01); *G06F 3/0442* (2019.05); *G06F 3/046* (2013.01)

(58) Field of Classification Search
CPC .. G06F 3/03545; G06F 3/0383; G06F 3/0442; G06F 3/046; G06F 3/0446
See application file for complete search history.

(56) References Cited

U.S. PATENT DOCUMENTS 5,534,671 A * 7/1996 Gierut .................... H01H 13/08
200/61.42
7,202,862 B1  4/2007 Palay et al.
(Continued)

FOREIGN PATENT DOCUMENTS

EP  2 790 085 A2  10/2014
JP  H07-44304 A   2/1995
(Continued)

OTHER PUBLICATIONS

Extended European Search Report dated Jan. 3, 2019 for European Application No. 16889403.8, 7 pages.
(Continued)

*Primary Examiner* — Bryan Earles
(74) *Attorney, Agent, or Firm* — Seed IP Law Group LLP

(57) ABSTRACT

An electronic pen is provided that is enhanced in strength such as not to be bent or broken even when made to be thinner (smaller in diametric size). A connection section holds a core body at one end thereof and holds a circuit board at the other end thereof. The circuit board is accommodated in a board protecting pipe, which is fitted to the connection section. The board protecting pipe is provided with a side opening, and an operation on an electronic part on the circuit board accommodated therein and a work on an electronic circuit formed on the circuit board can be performed through the side opening. An electronic pen main body section wherein the core body and the circuit board and the board protecting pipe are united together through the connection section is accommodated in a casing, to constitute the electronic pen.

21 Claims, 13 Drawing Sheets

Related U.S. Application Data continuation of application No. PCT/JP2016/086004, filed on Dec. 5, 2016.

(51) Int. Cl.
   *G06F 3/044* (2006.01)
   *G06F 3/046* (2006.01)

(56) References Cited

U.S. PATENT DOCUMENTS

| | | |
|---|---|---|
| 9,297,633 B2 | 3/2016 | Obata |
| 2008/0030486 A1 | 2/2008 | Cook |
| 2014/0306940 A1 | 10/2014 | Fukushima et al. |
| 2015/0084934 A1 | 3/2015 | Ho |
| 2015/0286309 A1 | 10/2015 | Chang et al. |
| 2015/0286310 A1 | 10/2015 | Chang et al. |
| 2015/0286311 A1 | 10/2015 | Chang et al. |
| 2015/0355748 A1 | 12/2015 | Liu et al. |
| 2016/0216784 A1* | 7/2016 | Kim .................. G06F 3/0441 |
| 2017/0068345 A1* | 3/2017 | Barel ................. G06F 3/0346 |
| 2017/0108955 A1* | 4/2017 | Mao .................. G06F 3/03545 |
| 2017/0185167 A1* | 6/2017 | Kitagawa ............. G06F 1/1632 |
| 2017/0185172 A1* | 6/2017 | Kitagawa ............. G06F 3/03545 |
| 2020/0167012 A1* | 5/2020 | Jung ..................... G06F 3/038 |
| 2022/0197410 A1* | 6/2022 | Kim .................... G06F 3/03545 |
| 2023/0195246 A1* | 6/2023 | Zimmerman ....... G06F 3/03545 |
| | | 345/179 |

FOREIGN PATENT DOCUMENTS

| | | |
|---|---|---|
| JP | H07-295722 A | 11/1995 |
| JP | 2013-161307 A | 8/2013 |
| JP | 2014-056523 A | 3/2014 |
| WO | 2015/007856 A1 | 1/2015 |
| WO | 2016/158418 A1 | 6/2016 |
| WO | 2017/044428 A1 | 3/2017 |

OTHER PUBLICATIONS

Japanese Office Action dated Nov. 17, 2021 for Japanese Application No. 2020-172920, 6 pages. (with English Translation thereof).
Notice of Reasons for Refusal dated Jul. 11, 2023, for Japanese Application No. 2022-077896, 8 pages (with English-language translation).

* cited by examiner

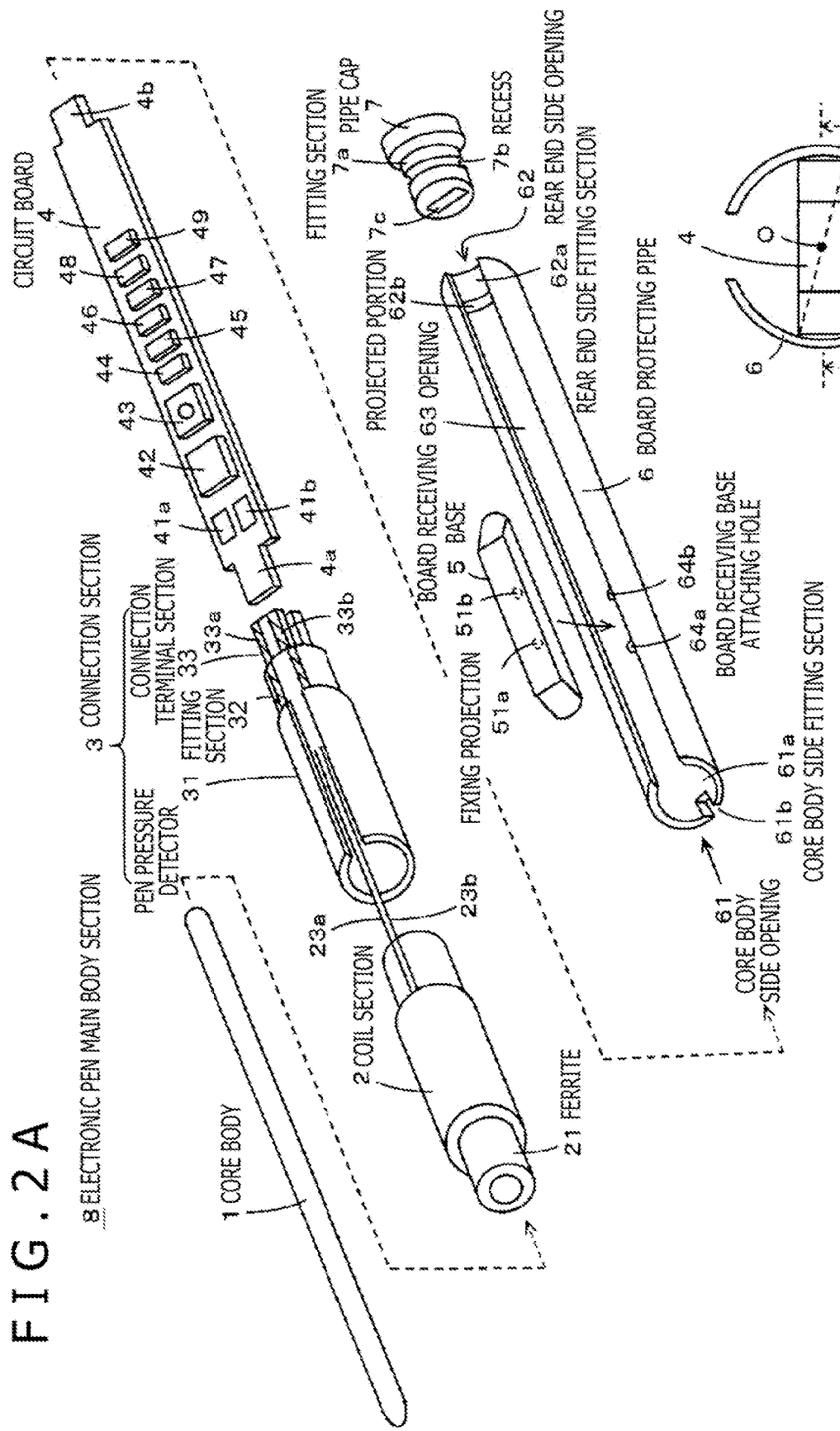
FIG. 2A
FIG. 2B

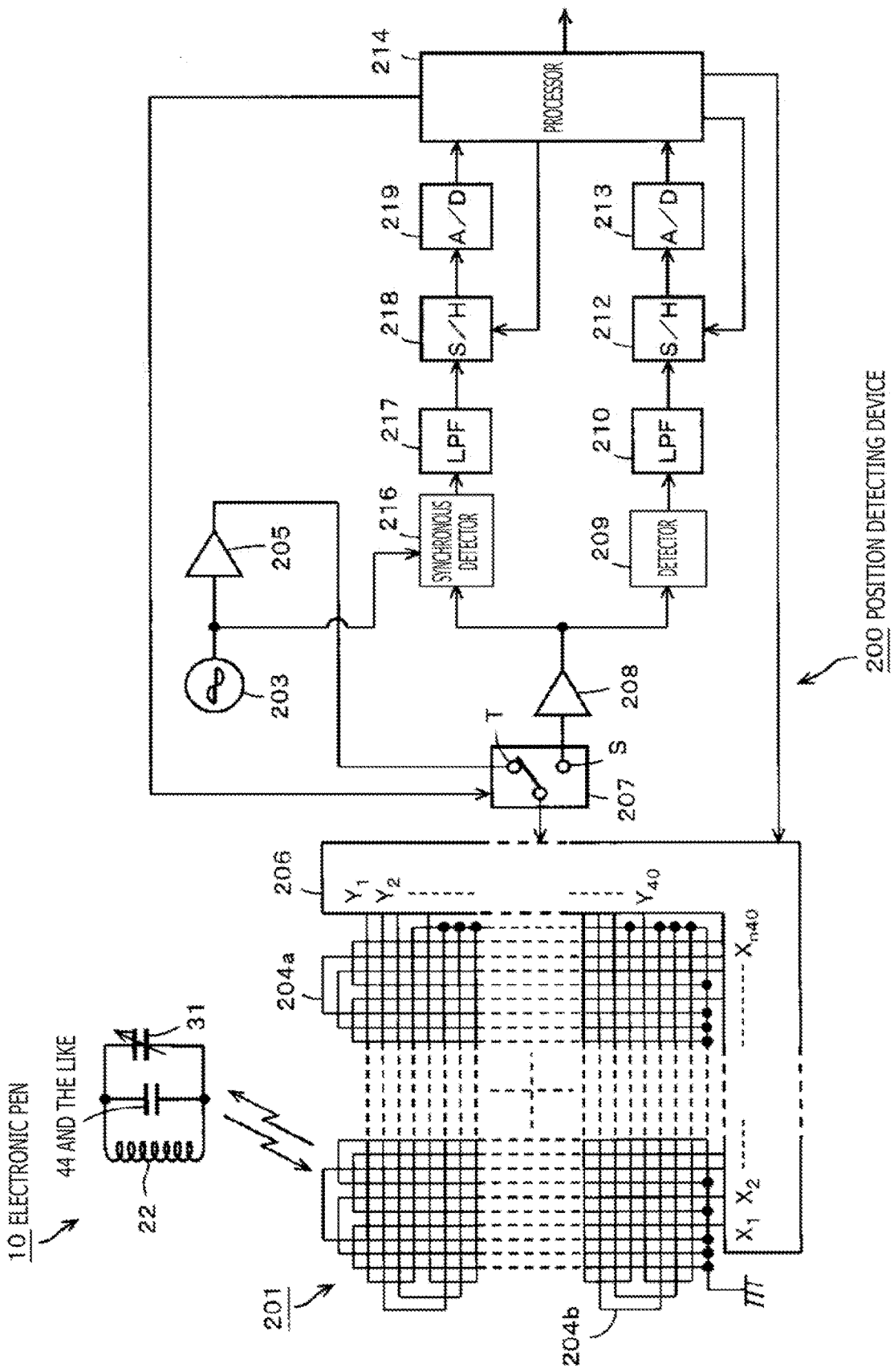

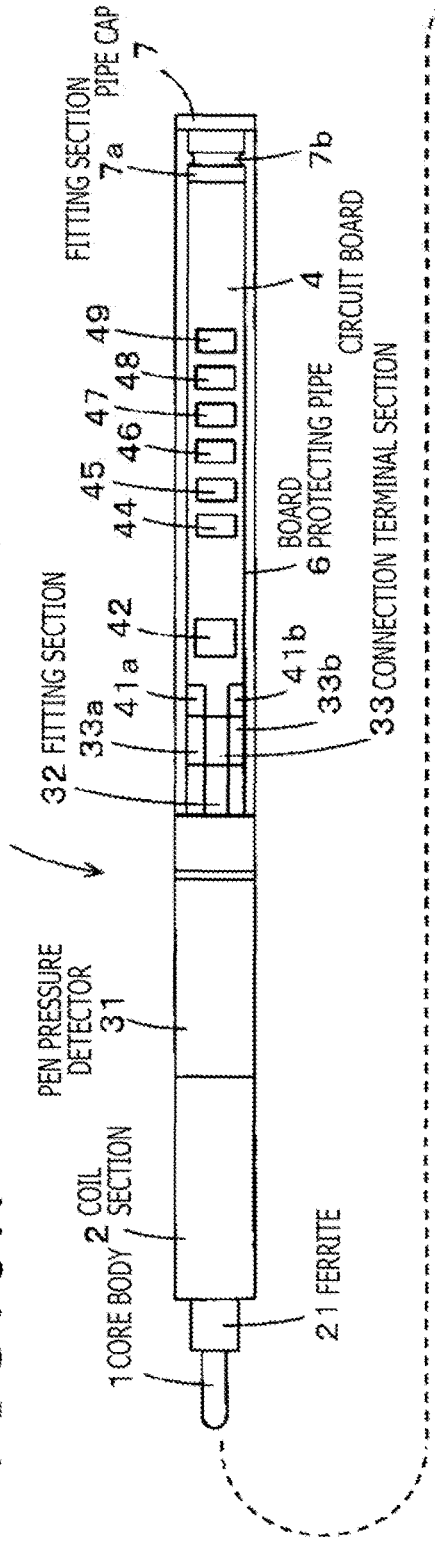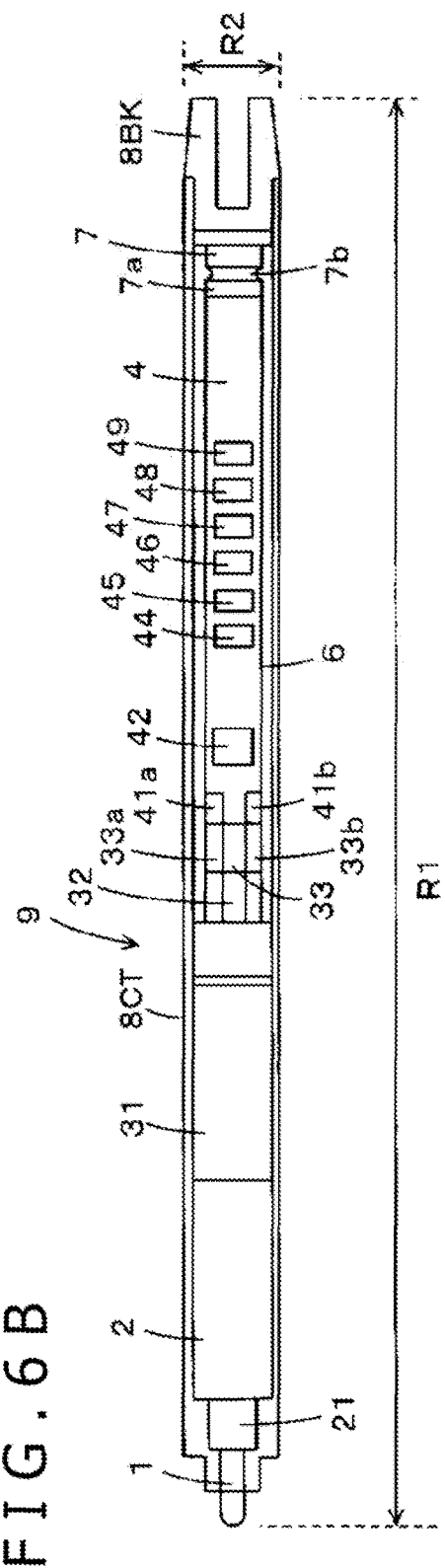

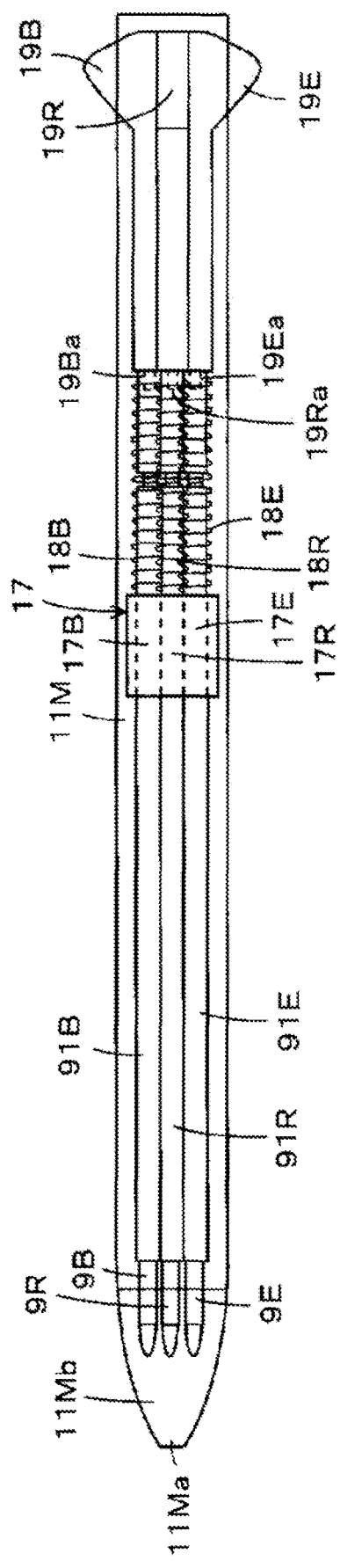
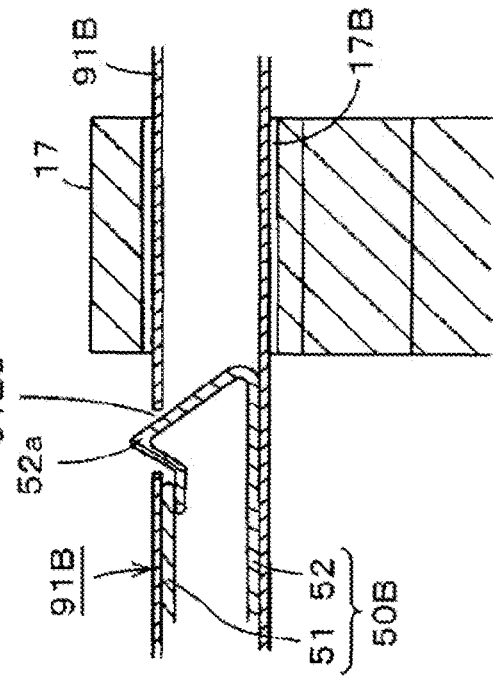
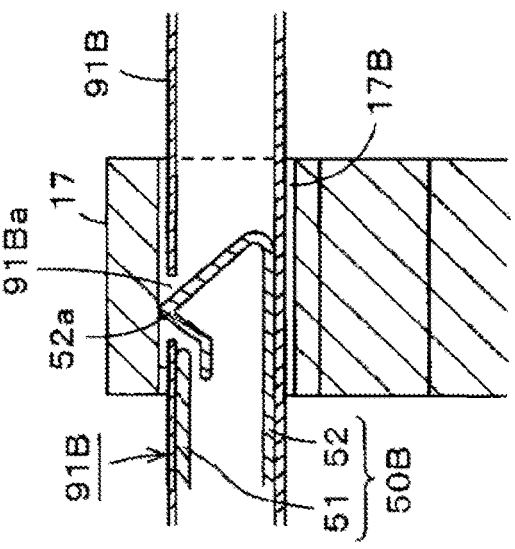
FIG.7A
FIG.7B
FIG.7C

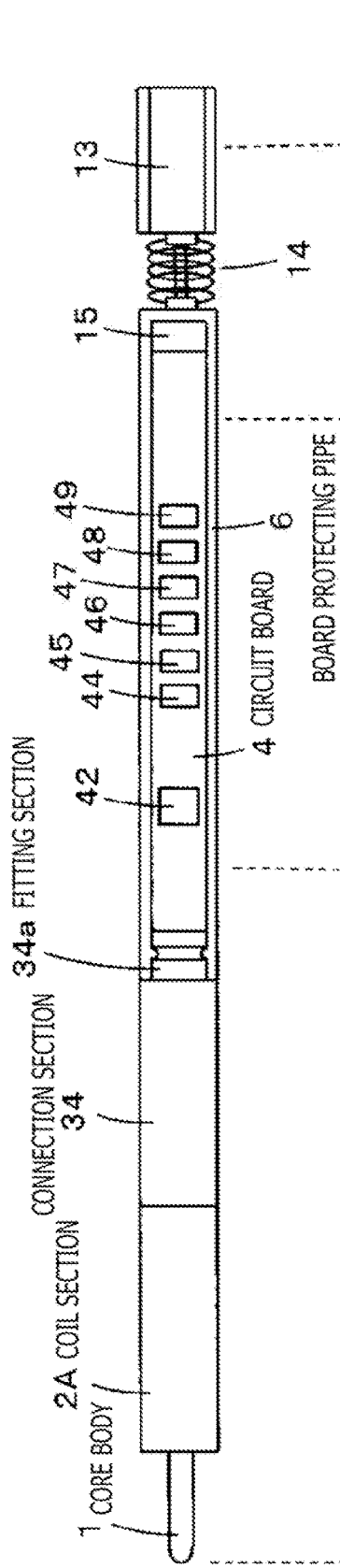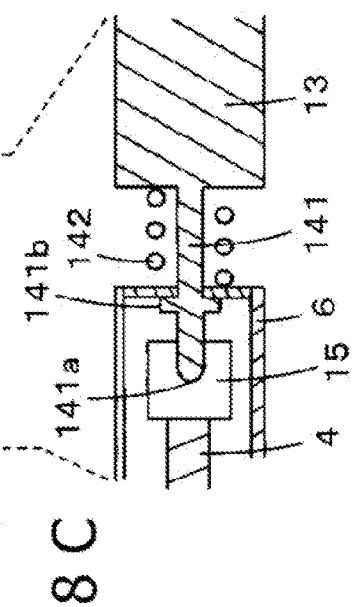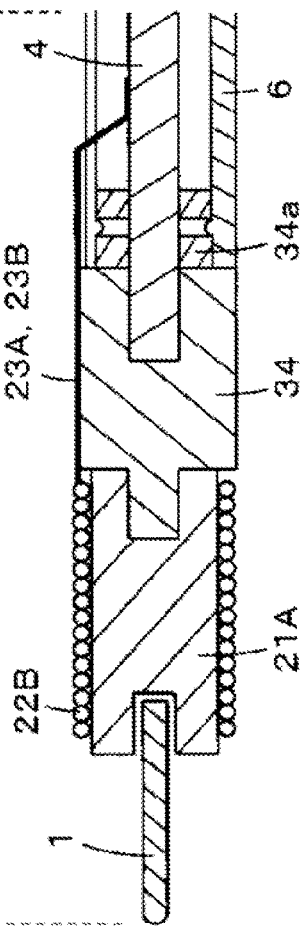

FIG.14A
FIG.14B
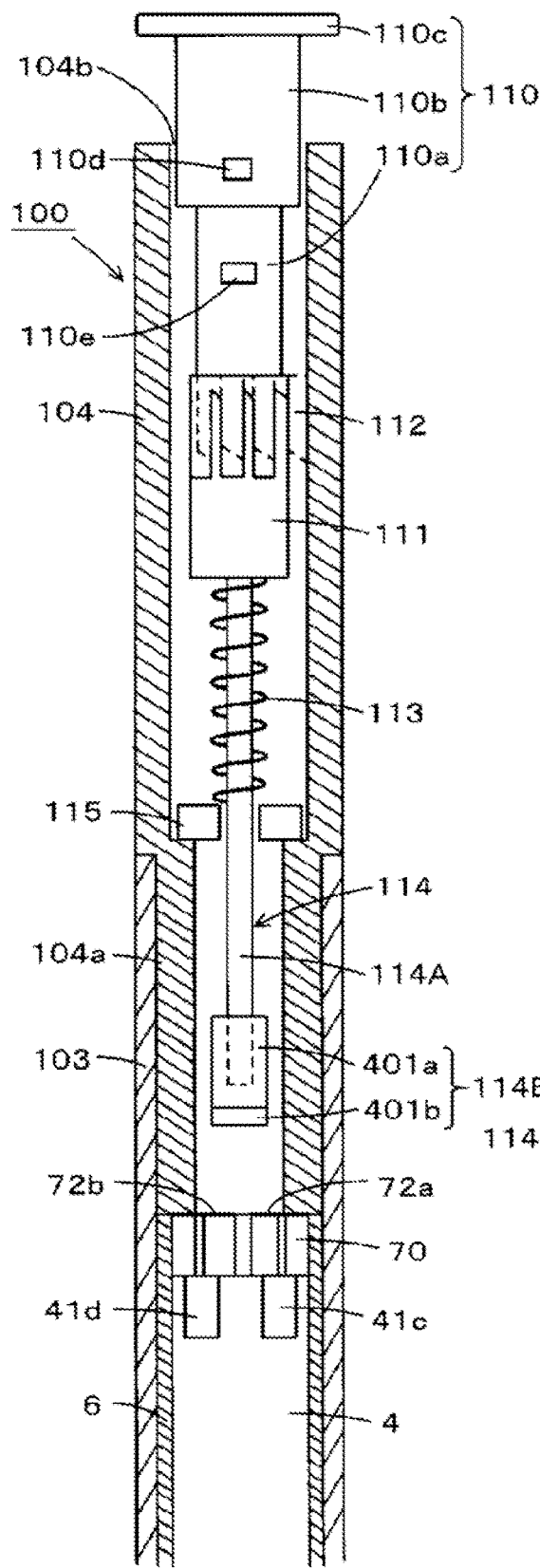
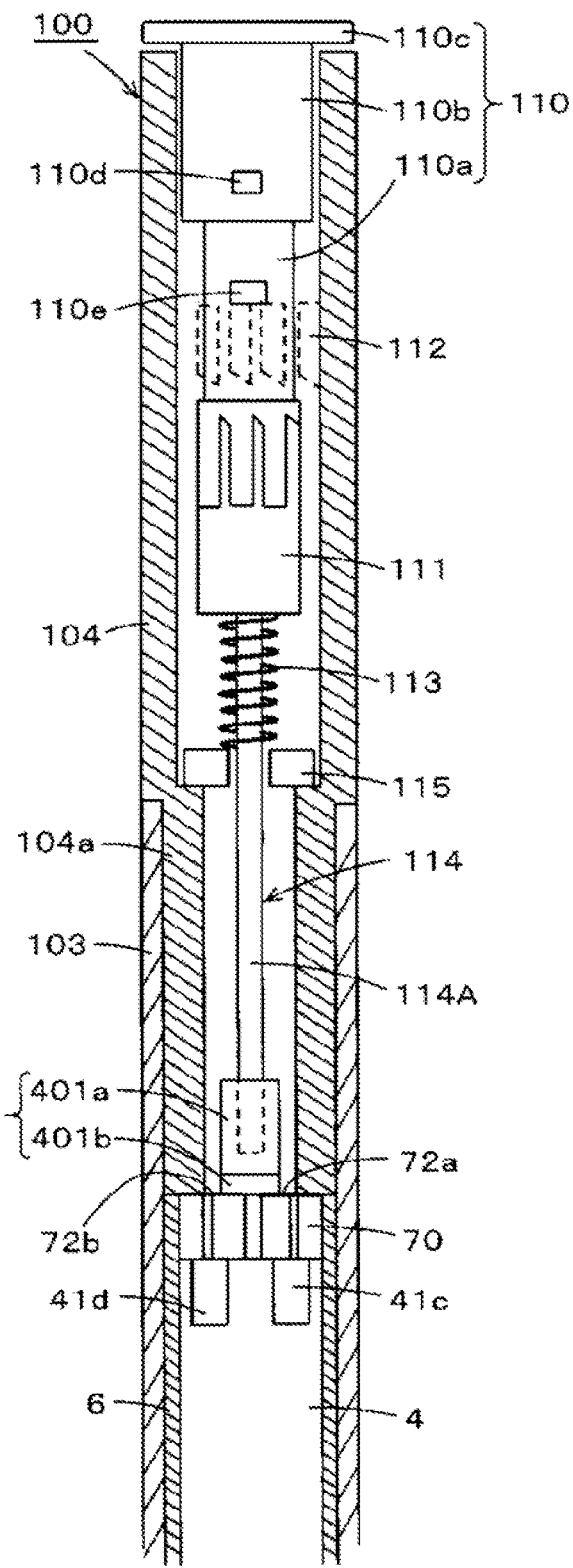

ELECTRONIC PEN

BACKGROUND

Technical Field

The present disclosure relates to an electronic pen which is a pen-type position indicator for use with a position detecting device.

Description of the Related Art

An electronic pen is grasped by a user, and is used to indicate a position on a sensor of a position detecting device. The position indicated on the sensor by the electronic pen is detected by the position detecting device through transfer of a position detection signal between the electronic pen and the sensor by various coupling systems such as an electromagnetic induction coupling system and a capacitive coupling system. Note that an example of an input device including an electronic pen and a coordinate detection sensor of the electromagnetic induction system is disclosed in Patent Document 1 set forth later, and an example of an input device including an electronic pen and a coordinate detection sensor of the capacitive system is disclosed in Patent Document 2 set forth later.

PRIOR ART DOCUMENT

Patent Documents

Patent Document 1: Japanese Patent Laid-Open No. 1995-044304
Patent Document 2: Japanese Patent Laid-Open No. 1995-295722

BRIEF SUMMARY

Technical Problems

An electronic pen used in a position detecting device of the electromagnetic induction coupling system or a capacitive coupling system is configured with a circuit board and a battery and the like mounted therein. For this reason, conventional electronic pens have been thicker (diametrically larger) than general writing utensils such as, for example, ball-point pens and fountain pens. However, attendant on the reductions in size and thickness of electronic apparatuses such as so-called tablet personal computers (PCs) with a position detecting device mounted therein and high-function mobile phone terminals called smartphones and the like, electronic pens have also come to be demanded to be smaller in thickness (diametric size).

In correspondence with this, formation of capacitors and the like on a circuit board incorporated in an electronic pen in the form of chips, reduction in the size of a pen pressure (writing pressure) detector and the like have been promoted, and reduction in the thickness (diametric size) of an electronic pen has also been advanced. However, attendant on the reduction in the thickness (diametric size) of the electronic pen, the thickness of an outside casing of the electronic pen has also been reduced, and there is a worry that the electronic pen might become weaker in strength, namely, might become liable to bend or break. In view of this, a technology for enhancing the strength of electronic pens on the trend toward smaller thickness (smaller diametric size) has come to be requested.

In consideration of the foregoing, it is an object of the present disclosure to provide an electronic pen enhanced in strength such as not to be bent or broken even when made thinner (smaller in diametric size).

Technical Solution

In order to solve the above problems, an electronic pen of the disclosure as described in claim 1 includes a core body, a circuit board, a connection member that holds the core body at one end thereof and holds the circuit board at an other end thereof, a rigid tubular member accommodating the circuit board, and a casing that accommodates the core body, the circuit board, the connection member, and the rigid tubular member such that a tip portion of the core body protrudes through an opening in the casing to outside of the casing. The rigid tubular member has a side opening that enables an operation to be performed on the accommodated circuit board, and is fitted to the connection member at one end in an axial direction thereof.

According to the electronic pen of the disclosure as described in claim 1, the connection member holds the core body at one end thereof and holds the circuit board at the other end thereof. The circuit board is accommodated in the rigid tubular member provided with the side opening, and the rigid tubular member is fitted to the connection member. By this, an electronic pen main body section (electronic pen functional section) wherein the core body, the circuit board, and the rigid tubular member are united together through the connection member is configured, and it is accommodated in the casing, whereby the electronic pen is configured.

By this, an electronic pen with high strength in which the circuit board is protected by the rigid tubular member can be formed. In addition, after the circuit board is accommodated in the rigid tubular member, an operation on an electronic part provided on the circuit board and a work on an electronic circuit formed on the circuit board can be performed through the side opening provided in the rigid tubular member.

Advantageous Effects

According to the present disclosure, it is possible to realize an electronic pen enhanced in strength such as not to be bent or broken even when made thinner (smaller in diametric size). Moreover, members can be firmly connected together, and an operation on an electronic part mounted on the circuit board and a work on the circuit board are prevented from becoming impossible to carry out.

BRIEF DESCRIPTION OF THE DRAWINGS

FIGS. 2A and 2B are an exploded perspective view and a cross-sectional view, respectively, for explaining the inside configuration of an electronic pen according to an embodiment of the present disclosure.

FIG. 5 is a block diagram depicting a circuit configuration example of an electronic pen and a position detecting device according to an embodiment of the present disclosure.

FIGS. 6A and 6B are figures for explaining an electronic pen cartridge configured by use of an electronic pen main body section according to an embodiment of the present disclosure.

FIGS. 7A, 7B, and 7C are figures for explaining an example in a case where the electronic pen cartridge is utilized for a casing of a multi-color ball-point pen.

FIGS. 8A, 8B, and 8C are figures for explaining an example in a case where a pen pressure detector is provided on a side opposite of the core body.

FIGS. 14A and 14B are figures for explaining a configuration example of a switch which utilizes a knocking mechanism of a ball-point pen.

DETAILED DESCRIPTION

Figure 1:
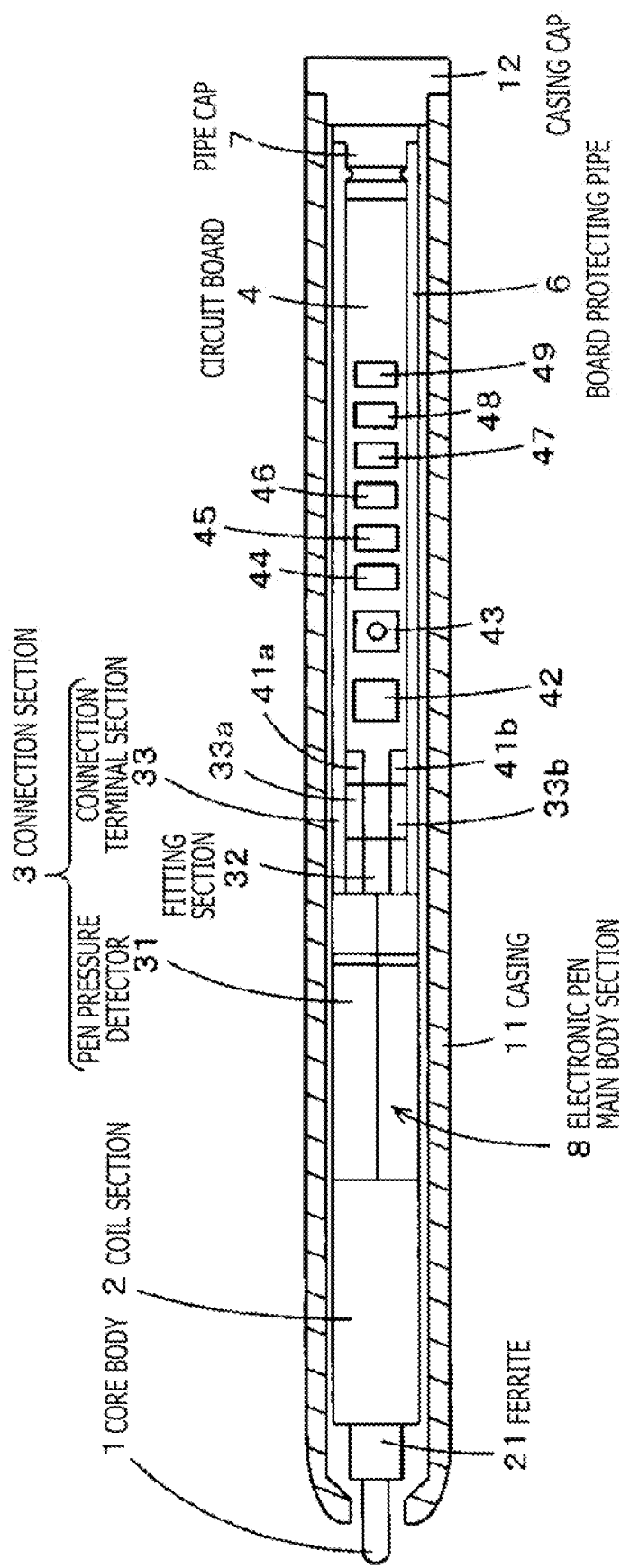
FIG. 1 is a figure for explaining an outline of an electronic pen according to an embodiment of the present disclosure.

An embodiment of an electronic pen according to the present disclosure will be described below, referring to the drawings. First, an embodiment in a case where the present disclosure is applied to an electronic pen of an electromagnetic induction system will be described.

[Configuration of Electronic Pen]

FIG. 1 is a figure for explaining a configuration example of an electronic pen of an embodiment of the present disclosure, and is for explaining an outline of the whole of an electronic pen 10 in the present embodiment. In FIG. 1, a casing (case) 11 of the electronic pen 10 in the present embodiment is cut, and the inside of the same is depicted.

The electronic pen 10 in the present embodiment has a configuration wherein an electronic pen main body section 8 is accommodated in the casing 11. As illustrated in FIG. 1, the electronic pen main body section 8 is a section configured to include a core body 1, a coil section 2, a connection section (connection member) 3, and a circuit board 4, in which a board protecting pipe (rigid tubular member) 6 is provided around the circuit board 4, and, further, an end of the board protecting pipe 6 on the side opposite to the core body 1 side is closed with a pipe cap 7.

FIG. 2A is an exploded perspective view for explaining the configuration of the electronic pen main body section 8. The coil section 2 is formed by winding an insulated wire (coated wire) around a hollow cylindrical ferrite 21. As depicted in FIG. 2A, ferrite portions around which the coated wire is not wound are provided on both sides in the axial direction of the coil section 2.

As depicted in FIG. 1 and FIG. 2A, the connection section 3 includes, in rough classification, a pen pressure detector 31, a fitting section 32, and a connection terminal section 33. The pen pressure detector 31 is configured in a cylindrical shape from a resin or the like, and the outer periphery and shape of its end face on the coil section 2 side are substantially coincident with the outer periphery and shape of that portion of the coil section 2 around which the coil is wound. Besides, on the side of that end face of the pen pressure detector 31 which faces the coil section 2, there is provided a recess for fitting to that ferrite section of the coil section 2 around which the coated wire is not wound. In addition, as will also be described later, a member for holding the core body 1 and a pressure-sensing part for detecting a pen pressure exerted on the core body 1 are provided inside the pen pressure detector 31.

The fitting section 32 is a section for fitting to the board protecting pipe 6 which will be described later. The fitting section 32 is formed, for example, in a substantially hollow cylindrical shape from a resin, a rigid rubber or the like, and is firmly fitted to and united with the pen pressure detector 31. Though not illustrated, a recess for fitting to a projected portion 4a of the circuit board 4 which will be described later is provided inside the fitting section 32. Note that the outside diameter of the fitting section 32 is slightly longer than the inside diameter of the board protecting pipe 6, such as to permit firm fitting of the fitting section 32 to the board protecting pipe 6. It is ensured that when the board protecting pipe 6 is fitted to the fitting section 32, the outer periphery of the board protecting pipe 6 coincides with the outer periphery of the pen pressure detector 31. In other words, the outside diameter of the coil section 2, the outside diameter of the pen pressure detector 31, and the outside diameter of the board protecting pipe 6 are substantially the same. Note that an end of the fitting section 32 on the side opposite to the core body 1 is provided with an inclined portion where the outer periphery of the fitting section 32 is shorter than the inner periphery of the board protecting pipe 6, in order to permit easy insertion of the board protecting pipe 6.

As depicted in FIG. 2A, the connection terminal section 33 is provided with upper and lower two plate portions for coupling to the fitting section 32. The plate portions are to be disposed such that the circuit board 4, which will be described later, is sandwiched therebetween. In this case, the spacing between the upper and lower two plate portions is slightly narrower than the thickness of the circuit board 4, such that the circuit board 4 can be clamped therebetween. As depicted in FIG. 1 and FIG. 2A, one of these two plate portions is provided with terminals 33a and 33b to which signal wires extended from terminal members of the pressure-sensing part of the pen pressure detector 31 are connected.

The circuit board 4 is formed in a configuration wherein terminals 41a and 41b and various circuit parts are mounted on a rectangular insulating substrate provided with projected portions 4a and 4b at both ends in the axial direction, and wiring for connecting them is provided on the insulating substrate. The various circuit parts include an integrated circuit (IC) 42 functioning as a control circuit, a side switch 43, and capacitors 44 to 49. As depicted in FIGS. 1 and 2A, the circuit board 4 is accommodated inside the board protecting pipe 6 and is thereby protected.

Ideally, the circuit board 4 is accommodated in the board protecting pipe 6 in such a manner that an axis O of the board protecting pipe 6 and the axis of the circuit board 4 substantially coincide with each other, as depicted in FIG. 2B. In this case, it is ideal for the circuit board 4 to be formed in such a manner that, exclusive of the parts of the projected portions 4a and 4b provided at both ends in the axial direction thereof, the diagonal of a section in a direction orthogonal to the axis thereof is equal to the inside diameter of the board protecting pipe 6. However, in order that the circuit board 4 can be easily accommodated in the board protecting pipe 6, the diagonal of the section in the direction orthogonal to the axial direction, indicated by dotted line in FIG. 2B, is set to be slightly shorter than the inside diameter of the board protecting pipe 6.

The board protective pipe 6 is a rigid tubular member which is formed by use of a metal, a carbon material, a synthetic resin or the like and is not liable to be broken or bent. As depicted in FIG. 2A, the board protecting pipe 6 has a core body side opening 61 and a rear end side opening 62 at both ends thereof. The core body side opening 61 and the rear end side opening 62 are openings in directions that intersect the axial direction. A part in a predetermined range inside the board protecting pipe 6 from the core body side opening 61 is a core body side fitting section 61a into which the fitting section 32 of the connection section 3 is inserted and fitted. Similarly, a part in a predetermined range inside the board protecting pipe 6 from the rear end side opening 62 is a rear end side fitting section 61a into which the pipe cap 7, to be described later, is inserted.

Note that in the present embodiment, as depicted in FIG. 2A, the part of the rear end side fitting section 62a is provided with a projected portion 62b for fitting to a recess 7b of the pipe cap 7 which will be described later. Besides, similarly to the case of the rear end side fitting section 62a, the core body side fitting section 61a may also be provided with a projected portion, and a recess conforming to the projected portion may be provided in the fitting section 32 of the connection section 3. With such a configuration, the fitting section 32 of the connection section 3 and the board protecting pipe 6 can be fitted to each other more firmly.

Further, the board protecting pipe 6 has an opening (a side opening in a direction along the axial direction) 63 formed in the manner of cutting away a part of a side wall of the board protecting pipe 6 such as to interconnect the core body side opening 61 and the rear end side opening 62. In this case, the board protecting pipe 6 has a side wall in an angular range of not less than 180 degrees with its axis as a center, notwithstanding it is provided with the opening 63. More specifically, as depicted in FIG. 2B, the side wall of the board protecting pipe 6 is left in such a manner that when the circuit board 4 is accommodated in the board protecting pipe 6, both long sides of that surface of the circuit board 4 which faces the opening 63 make contact with an inner wall of the board protecting pipe 6. In other words, the width in a direction orthogonal to the axial direction of the opening 63 is set to be narrower than the width in a direction intersecting the axial direction of other portion of the circuit board 4 than the projected portions 4a and 4b.

In addition, as depicted in FIG. 2A, the board protecting pipe 6 is provided with a cutout 61b in a part of the core body side fitting section 61a. Though not illustrated, a projected portion provided in the fitting section 32 of the connection section 3 is fitted to the cutout 61b, whereby it is ensured that where the board protecting pipe 6 is fitted to the fitting section 32, their positions are restricted such as to prevent both of them from rotating. Besides, as depicted in FIG. 2A, the board protecting pipe 6 is provided with board receiving base attaching holes 64a and 64b as board fixing portions for fixing the board.

A trapezoidal board receiving base 5 is attached to the board receiving base attaching holes 64a and 64b of the board protecting pipe 6, as depicted in FIG. 2A. That surface of the board receiving base 5 which is attached to the board protecting pipe 6 is curved correspondingly to the shape of the inner wall of the board protecting pipe 6, as depicted in FIG., and is provided with fixing projections 51a and 51b to be fitted to the board receiving base attaching holes 64a and 64b, as depicted in FIG. 2A. With the fixing projections 51a and 51b of the board receiving base fitted into the board receiving base attaching holes 64a and 64b of the board protecting pipe 6, the board receiving base 5 is fixed to the board protecting pipe 6. The board receiving base 5 is provided between the board protecting pipe 6 and the circuit board 4, as illustrated in FIG. 2B.

Note that the board fixing portions can be used not only for attaching the board receiving base 5 but also for fixing the board protecting pipe to a workbench or the like. In addition, the board fixing portions are not limited to the attaching holes. For example, in the case where the board receiving base 5 is provided with a recess or recesses, the board fixing portions may be in the shape of a projection or projections to be fitted to the recess or recesses; alternatively, the board fixing portions may be in the shape of hooks for clamping the board receiving base on front and rear sides of the board receiving base; thus, various modes for fixing the board receiving base 5 to the board protecting pipe 6 can be adopted.

Further, as depicted in FIG. 2A, the pipe cap 7 is provided which is fitted to the rear end side fitting section 62a of the board protecting pipe 6. The pipe cap 7 has a fitting section 7a coinciding with the inside diameter of the rear end side fitting section 62a of the board protecting pipe 6, and the fitting section 7a is provided with the recess 7b conforming to the projected portion 62b provided in the rear end side fitting section 62a of the board protecting pipe 6. In addition, the fitting section 7a of the pipe cap 7 is provided on the inside thereof with a recess 7c to which the projected portion 4b of the circuit board 4 is fitted. Besides, an end, on the side opposite to the board protecting pipe 6, of the fitting section 7a of the pipe cap 7 is a flange portion which has a diameter equal to the outside diameter of the board protecting pipe 6 and has a certain extent of thickness.

The core body 1 penetrates the ferrite 21 of the coil section 2, reaches the pen pressure detector 31 of the connection section 3 fitted to the ferrite 21, and is held at the pen pressure detector 31. Besides, the circuit board 4 is inserted in between the two plate portions of the connection terminal section 33 of the connection section 3. By this, the projected portion 4a on the core body side of the circuit board 4 is fitted into the recess of the fitting section 32, and the circuit board 4 is clamped between the two plate portions of the connection terminal section 33. In addition, the terminal 33a of the connection terminal section 33 and the terminal 41a of the circuit board 4 are connected to each other, and the terminal 33b of the connection terminal section 33 and the terminal 41b of the circuit board 4 are connected to each other.

The terminals 41a and 41b of the circuit board 4 are connected to an electronic circuit formed on the circuit board 4 that includes the IC 42, the side switch 43, the capacitors 44 to 49 and the like. By this, a pen pressure can be detected at the IC 42 and can be utilized. In addition, though not illustrated in FIGS. 2A and 2B, extension wires 23a and 23b extending from both coil ends of the coil section 2 are also connected to the electronic circuit formed on the circuit board 4. By this, the coil 22 constitutes a resonance circuit together with the IC 42 and the capacitors 44, 45, . . . on the circuit board 4, and, though details will be described later, signals can be transferred between the position detecting device and the electronic pen 10 in the present embodiment.

Figure 3:
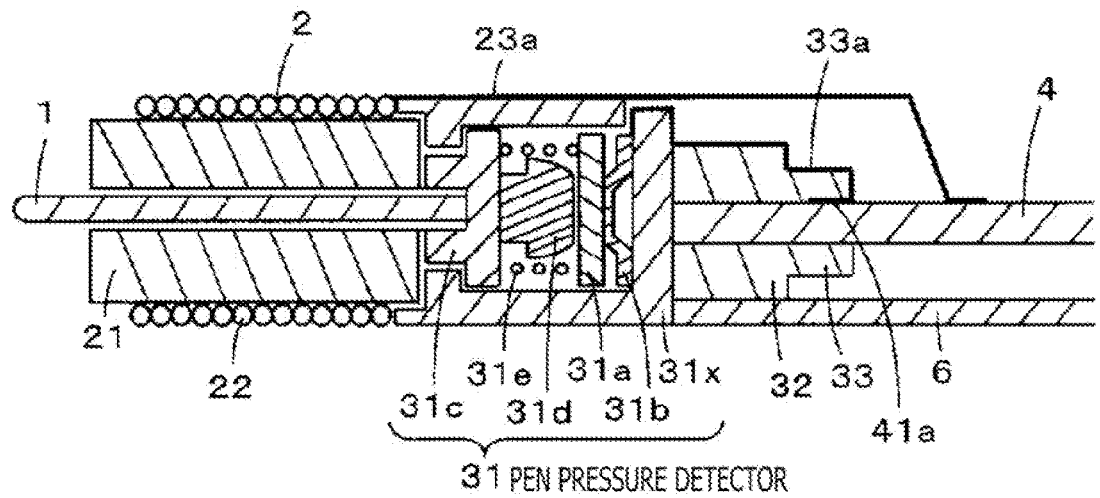
FIG. 3 is a sectional view of a part where a core body, a coil section, a pressure detector, a circuit board, and a board protecting pipe are connected, in an electronic pen according to an embodiment of the present disclosure.

FIG. 3 is a sectional view of a connection site in the case where the core body 1, the coil section 2, the connection section 3, the circuit board 4, and the board protecting pipe 6 are connected. In FIG. 3, the pen pressure detector 31 of the connection section 3 is formed by providing the pressure-sensing parts in a resin mold 31x, for example. Besides, as depicted in FIG. 3, that ferrite 21 part of the coil section 2 around which the coil 22 is not wound is fitted into and connected to the recess in the pen pressure detector 31 of the connection section 3.

As depicted in FIG. 3, the pressure-sensing parts of the pen pressure detector 31 consist of a plurality of parts, namely, a dielectric 31a, a terminal member 31b, a holding member 31c, a conductive member 31d, and an elastic member 31e. The terminal member 31b is formed of a conductive material, and constitutes a first electrode of a variable capacitor composed of the pressure-sensing parts. In addition, the conductive member 31d is composed, for example, of a conductive rubber, and the elastic member 31e is composed of a coil spring formed of a conductive material. The conductive member 31d and the elastic member 31e are electrically connected, and constitute a second electrode of the variable capacitor.

As depicted in FIG. 3, the core body 1 penetrates the hollow cylindrical ferrite 21 of the coil section 2, and reaches, and is held by, the holding member 31c of the pen pressure detector 31. By this, the capacitance of the variable capacitor (pressure-sensing member) formed between the terminal member 31b constituting the first electrode and the conductive member 31d constituting the second electrode is varied according to a pressure exerted on the core body 1. Variation in the capacitance of the variable capacitor is connected to the connection terminals 33a and 33b of the connection terminal section 33 through the signal wires.

Further, as depicted in FIG. 3, the core body side projected portion 4a of the circuit board 4 is fitted into the fitting section 32, and the circuit board 4 is connected to the two plate portions of the connection terminal section 33 in the manner of being clamped between the two plate portions. By this, as depicted in FIG. 3, the connection terminal 33a of the connection terminal section 33 and the terminal 41a of the circuit board 4 are connected. In addition, the connection terminal 33b of the connection terminal section 33 and the terminal 41b of the circuit board 4 are connected. By this, as aforementioned, the signal wires extending from the terminal members of the pressure-sensing parts of the pen pressure detector 31 are connected to the circuit board 4. In addition, as depicted in FIG. 3, the extension wires 23a and 23b extending from both ends of the coil section 2 and the circuit board 4 are connected, and constitute the resonance circuit together with the capacitors 44 and the like on the circuit board 4, as also aforementioned.

The circuit board 4 is accommodated in the board protecting pipe 6. In this case, the fitting section 32 of the connection section 3 and the core body side fitting section 61a of the board protecting pipe 6 are fitted to each other, such that the connection section 3 and the board protecting pipe 6 are not separated from each other. By this, the circuit board 4 is protected by the board protecting pipe 6, and is prevented from being bent or broken.

Figure 4A:
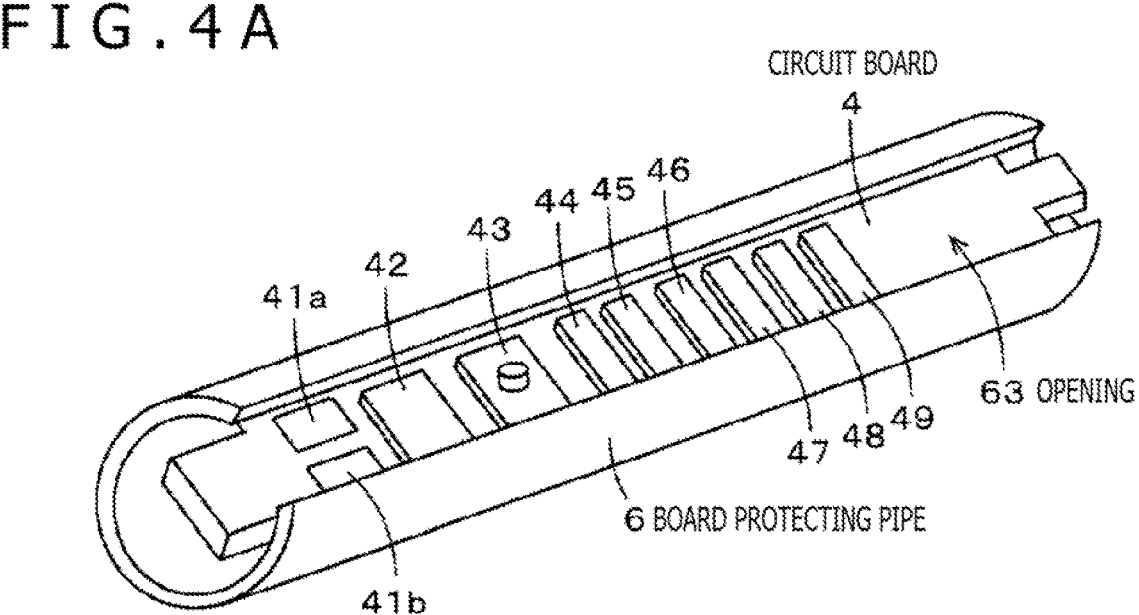
FIGS. 4A and 4B are figures for explaining a state in which the circuit board is accommodated in the board protecting pipe, in an electronic pen according to an embodiment of the present disclosure.

FIG. 4A is a figure for explaining a state in which the circuit board 4 is accommodated in the board protecting pipe 6. As depicted in FIG. 4A, the overall length of the board protecting pipe 6 and that of the circuit board 4 are substantially the same. In other words, the whole of the circuit board 4 can be accommodated in the board protecting pipe 6. In addition, in the state in which the circuit board 4 is accommodated in the board protecting pipe 6, the side switch 43 can be operated through the opening 63 which is provided in an upper portion of the board protecting pipe 6 in FIG. 4A.

Besides, as also aforementioned, the coil 22 of the coil section 2 and the plurality of capacitors 44 to 49 on the circuit board 4 are connected to constitute the resonance circuit, so that signals can be transferred between the electronic pen 10 and the position detecting device. However, in view of the capacitance in the resonance circuit, all the capacitors may not necessarily be connected. In such a case, an operation of cutting the connection of the unrequired capacitors by laser or the like can be performed on the circuit board 4 through the opening 63.

Figure 4B:
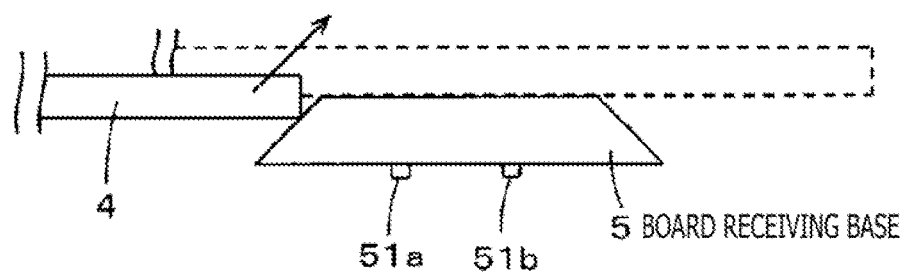

In addition, when the circuit board 4 is accommodated into the board protecting pipe 6 through, for example, the core body side opening 61 of the board protecting pipe 6, the lower side of a tip of the circuit board 4 comes into contact with an inclined surface of the trapezoidal board receiving base, as depicted in FIG. 4B, and is pushed up in the direction of arrow. As also aforementioned, the diagonal of the section as viewed in the axial direction of the circuit board 4 is slightly shorter than the inside diameter of the board protecting pipe 6. Therefore, with the circuit board 4 slightly lifted up by the board receiving base 5, both long sides of that surface of the circuit board 4 which faces the opening 63 of the board protecting pipe 6 are pressed against the inner wall of the board protecting pipe 6.

By this, the circuit board 4 is clamped between the board receiving base 5 and the board protecting pipe 6, and is thereby fixed in the board protecting pipe 6. Note that also in the case of accommodating the circuit board 4 through the rear end side opening 62, the circuit board 4 can be similarly clamped between the board receiving base 5 and the board protecting pipe 6. Further, the pipe cap 7 is fitted into the rear end side opening 62 of the board protecting pipe 6, and the recess 7c in the pipe cap 7 is fitted to the rear end side projected portion 4b of the circuit board 4.

In this way, the coil section 2 is fixed by being fitted to the recess provided in the pen pressure detector 31 of the connection section 3. Then, the core body 1 penetrating the ferrite of the coil section 2 reaches the holding member 31c of the pen pressure detector 31 and is thereby held. In addition, the circuit board 4 is fitted to the recess in the fitting section 32 of the connection section 3, and, further, is clamped between the two plate portions of the connection terminal section 33, to be thereby fixed. Besides, the circuit board 4 is fixed in the board protecting pipe 6, by the action of the board receiving base 5 fixed in the board protecting pipe 6, and is thereby protected from external pressures. In addition, the board protecting pipe 6 is fixed by being fitted to the fitting section 32 of the connection section 3.

Further, the pipe cap 7 is fitted into the rear end side opening 62 of the board protecting pipe 6, and the recess 7c in the pipe cap 7 is fitted to the rear end side projected portion 4b of the circuit board 4, whereby the circuit board 4 is fixed within the board protecting pipe 6. By this, the electronic pen main body section 8 is formed wherein the core body 1, the coil section 2, the connection section 3, the circuit board 4, the board receiving base 5 and the board protecting pipe 6, and the pipe cap 7 are united together. The electronic pen main body section 8 formed in this way is accommodated in the casing 11, and a casing cap 12 is attached thereto, as depicted in FIG. 1, whereby the electronic pen 10 to be used by a user is configured. Note that the pipe cap 7 and the casing cap 12 may be integral with each other. In other words, the pipe cap 7 and the casing cap 12 may be configured as an integral body.

[Outline of Coordinate Detection Sensor of Electromagnetic Resonance System]

A circuit configuration example in a specific embodiment of a position detecting device 200 of an electromagnetic resonance system for detection of an indicated position and detection (sensing) of a pen pressure by use of the electronic pen 10 of the electromagnetic resonance system described using FIGS. 1 to 4 will be described below, referring to FIG. 5. FIG. 5 is a block diagram depicting a circuit configuration example of the electronic pen 10 and the position detecting device 200. The electronic pen 10 and the position detecting device 200 constitute an input device.

The electronic pen 10 is represented, in terms of circuit configuration, by a resonance circuit which includes a position indication coil 22, a pen pressure detector (inclusive of a variable capacitor as a pressure-sensing part) 31 connected to the position indication coil 22, and a resonance capacitor 44 and the like connected in parallel to the pen pressure detector 31.

On the other hand, the position detecting device 200 includes an X-axis direction loop coil group 204a and a Y-axis direction loop coil group 204b provided in a stacked form, whereby a coordinate detection sensor 201 of an electromagnetic induction system is formed. Each of the loop coil groups 204a and 204b is composed of 40 rectangular loop coils, for example. The loop coils constituting each of the loop coil groups 204a and 204b are disposed in the state of sequentially overlapping while being aligned at regular intervals.

In addition, the position detecting device 200 is provided with a selection circuit 206 to which the X-axis direction loop coil group 204a and the Y-axis direction loop coil group 204b are connected. The selection circuit 206 sequentially selects one loop coil from among the two loop coil groups 204a and 204b.

Further, the position detecting device 200 is provided with an oscillator 203, a current driver 205, a change-over connection circuit 207, a reception amplifier 208, a detector 209, a low-pass filter 210, a sample hold circuit 212, an analog to digital (A/D) conversion circuit 213, a synchronous detector 216, a low-pass filter 217, a sample hold circuit 218, an A/D conversion circuit 219, and a processor 214.

The oscillator 203 is an oscillator that generates an alternate current (AC) signal of a frequency f0 and supplies it to the current driver 205 and the synchronous detector 216. The current driver 205 converts the AC signal supplied from the oscillator 203 into a current, and outputs it to the change-over connection circuit 207. The change-over connection circuit 207 changes over a connection destination (a transmission-side terminal T, a reception-side terminal S) to which the loop coil selected by the selection circuit 206 is connected, according to a control from the processor 214 which will be described later. Of these connection destinations, the transmission-side terminal T is connected with the current driver 205, whereas the reception-side terminal R is connected with the reception amplifier 208.

An induced voltage generated in the loop coil selected by the selection circuit 206 is sent to the reception amplifier 208 through the selection circuit 206 and the change-over connection circuit 207. The reception amplifier 208 amplifies the induced voltage supplied from the loop coil, and outputs the amplified voltage to the detector 209 and the synchronous detector 216.

The detector 209 detects the induced voltage generated in the loop coil, namely, the received signal, and outputs it to the low-pass filter 210. The low-pass filter 210 has a cutoff frequency sufficiently lower than the aforementioned frequency f0, converts the output signal of the detector 209 into a direct current (DC) signal, and outputs it to the sample hold circuit 212. The sample hold circuit 212 holds the voltage value of the output signal of the low-pass filter 210 at a predetermined timing, specifically, at a predetermined timing during a reception period, and outputs it to the A/D conversion circuit 213. The A/D conversion circuit 213 converts the analog output of the sample hold circuit 212 into a digital signal, and outputs it to the processor 214.

On the other hand, the synchronous detector 216 synchronously detects the output signal of the reception amplifier 208 by using the AC signal from the oscillator 203, and outputs to the low-pass filter 217 a signal at a level according to a phase difference between these signals. The low-pass filter 217 has a cutoff frequency sufficiently lower than the frequency f0, converts the output signal of the synchronous detector 216 into a DC signal, and outputs it to the sample hold circuit 218. The sample hold circuit 218 holds the voltage value of the output signal of the low-pass filter 217 at a predetermined timing, and outputs it to the A/D conversion circuit 219. The A/D conversion circuit 219 converts the analog output of the sample hold circuit 218 into a digital signal, and outputs it to the processor 214.

The processor 214 controls each part of the position detecting device 200. Specifically, the processor 214 controls selection of the loop coil in the selection circuit 206, change-over in the change-over connection circuit 207, and the timings in the sample hold circuits 212 and 218. The processor 214 causes electromagnetic waves to be transmitted from the X-axis direction loop coil group 204a and the Y-axis direction loop coil group 204b at predetermined transmission continuation periods, based on the signals inputted from the A/D conversion circuits 213 and 219.

In each loop coil of the X-axis direction loop coil group 204a and the Y-axis direction loop coil group 204b, an induced voltage is generated by an electromagnetic wave transmitted from the electronic pen 10. Based on the level of the voltage value of the induced voltage generated in each loop coil, the processor 214 calculates coordinate values of the indicated position in an X-axis direction and a Y-axis direction of the electronic pen 10. In addition, the processor 214 detects a pen pressure, based on a phase difference between the transmitted electromagnetic wave and the received electromagnetic wave. In this way, the input device can be configured by the electronic pen 10 of the electromagnetic resonance system in the present embodiment and the position detecting device 200 of the electromagnetic resonance system depicted in FIG. 5.

[Electronic Pen Main Body Section of Cartridge Type]

Utilizing the electronic pen main body section 8 in the present embodiment, an electronic pen cartridge of the same shape as that of a refill of a ball-point pen, for example, can be configured, and by attaching it to the inside of a ball-point pen casing, for example, an electronic pen can be configured. FIGS. 6A and 6B are figures for explaining an electronic pen cartridge configured by use of the electronic pen main body section 8 in the present embodiment.

FIG. 6A is the electronic pen main body section 8 configured as described using FIGS. 1 to 4. FIG. 6A depicts a tubular cartridge casing 8CT in which to accommodate the electronic pen main body section 8. Of the cartridge casing 8CT, a left-side end (core body side end) in FIG. 6A has a small opening such that a tip portion of the core body of the electronic pen main body section 8 is protruded therethrough. In addition, of the cartridge casing 8CT, a right-side end (rear end side end) in FIG. 6A has an opening through which to insert the electronic pen main body section 8.

As indicated by dotted-line arrow in FIG. 6A, the electronic pen main body section 8 is accommodated into the cartridge casing 8CT through the opening at the rear end side end. FIG. 6B depicts an external appearance of an electronic pen cartridge 9 configured by accommodating the electronic pen main body section 8 in the cartridge casing 8CT. Note that in FIG. 6B, there is depicted a case where the cartridge casing 8CT is composed of a transparent synthetic resin, so that the inside thereof can be visually checked.

In the case of this example, as depicted in FIG. 6B, only a tip portion of the core body 1 of the electronic pen main body section 8 is protruding from the opening at the core body side end of the cartridge casing 8CT, and the other portion of the electronic pen main body section 8 is located inside the cartridge casing 8CT. The opening at the rear end side end of the cartridge casing 8CT is closed by fitting a cartridge casing cap 8BK thereto. As depicted in FIG. 6B, the cartridge casing cap 8BK in this example is provided with a recess for mounting into a ball-point pen casing, similarly to a refill of a ball-point pen. Note that the pipe cap 7 and the cartridge casing cap 8BK may be integral with each other. In other words, the pipe cap 7 and the cartridge casing cap 8BK may be configured as an integral body.

As illustrated in FIG. 6B, of the electronic pen cartridge 9 in this example, a length R1 in the longitudinal direction and a width R2 in a direction orthogonal to the longitudinal direction are coincident with the length and the width of a refill of a ball-point pen to which this cartridge is attached.

By this, it is ensured that where the electronic pen cartridge 9 in this example formed by accommodating the electronic pen main body section 8 in the cartridge casing 8CT is mounted into a predetermined ball-point pen casing, an electronic pen to be used by a user can be thereby configured. In other words, an electronic pen can be configured by using an existing ball-point pen casing and the electronic pen cartridge 9. By this, an electronic pen with good utility can be handily configured by utilizing a casing of a ball-point pen which the user is accustomed to use.

In addition, as described using FIGS. 6A and 6B, in the case where the electronic pen cartridge 9 is formed, it can be utilized in place of a refill to be mounted into a casing of a multi-color ball-point pen. FIGS. 7A, 7B, and 7C are figures for explaining an example in a case where the electronic pen cartridge is utilized for a casing of a multi-color ball-point pen.

FIG. 7A is a configuration view depicting an external appearance of an electronic pen 10X in this example. In the example of FIG. 7A, also, a casing 11M of the electronic pen 10X is composed of a transparent synthetic resin, so that the inside thereof is seen through.

The casing 11M of the electronic pen 10X has the same configuration as that of a casing and a knock cam mechanism of a commercialized knock-type multi-color ball-point pen. The casing and the knock cam mechanism of a commercialized knock-type multi-color ball-point pen may be used as they are. In this example, three electronic pen cartridges 9B, 9R, and 9E are accommodated in the casing 11M.

The casing 11M is formed with an opening 11Ma on one end side in the axial direction thereof, so that when one of the electronic pen cartridges 9B, 9R, and 9E is moved sliding in the axial direction by the knocking mechanism, a tip portion of the core body 1 thereof is protruded to the outside through the opening 11Ma.

In a state in which none of the electronic pen cartridges 9B, 9R, and 9E is moved sliding in the axial direction by the knocking mechanism, as depicted in FIG. 7A, the whole body of the cartridges inclusive of the tips of the respective core bodies 1 is accommodated in a hollow part of the casing 11M and is thereby protected. Then, as aforementioned, the tip of the core body 1 of that one of the electronic pen cartridges 9B, 9R, and 9E which is moved sliding in the axial direction by the knocking mechanism is protruded to the exterior through the opening 11Ma. Therefore, the electronic pen cartridge of which the tip of the core body 1 is protruded to the outside through the opening 11Ma by the knocking mechanism is released from protection.

The electronic pen cartridges 9B, 9R, and 9E are configured, on an external shape basis, similarly to the electronic pen cartridge 9 described using FIGS. 6A and 6B, except that they are configured in the same size as a refill of a multi-color ball-point pen. It is to be noted that in the electronic pen cartridges 9B, 9R, and 9E in the case of this example, cartridge casings 91B, 91R, and 91E (corresponding to the cartridge casing 8CT in the drawing) are each provided with a switch member which is turned ON and OFF according to the movement in the axial direction by the knocking mechanism, as will be described later.

In the electronic pen 10X in this example, as will be described later, whether the respective electronic pen cartridges 9B, 9R, and 9E are protected in the electronic pen 10X by the knocking mechanism is detected, based on the states of the switches provided in the electronic pen cartridges 9B, 9R, and 9E. The other configurations of the electronic pen cartridges 9B, 9R, and 9E are similarly to those of the electronic pen cartridge 9 described using FIGS. 1 to 4B, 6A and 6B.

The knocking mechanism of the electronic pen 10X includes knock rods 19B, 19R, and 19E provided with fitting sections 19Ba, 19Ra, and 19Ea to which the electronic pen cartridges 9B, 9R, and 9E are fitted individually, and coil springs 18B, 18R, and 18E disposed between the respective fitting sections 19Ba, 19Ra, and 19Ea of the electronic pen cartridges 9B, 9R, and 9E and a spring receiving member 17.

The spring receiving member 17 is attached in the state of being fixed at a predetermined position in the axial direction in the hollow part of the casing 11M. The spring receiving member 17 is formed therein with through-holes 17B, 17R, and 17E in and through which the cartridge casings 91B, 91R, and 91E of the electronic pen cartridges 9B, 9R, and 9E are inserted and passed. The electronic pen cartridges 9B, 9R, and 9E are passed through the through-holes 17B, 17R, and 17E of the spring receiving member 17 and through the coil springs 18B, 18R, and 18E and fitted to the fitting sections 19Ba, 19Ra, and 19Ea of the knock rods 19B, 19R, and 19E, thereby being attached to the electronic pen 10X.

Those parts of the casing 11M in which the knock rods 19B, 19R, and 19E are accommodated are provide with through-slits (omitted from illustration in FIG. 7A) through which parts of the knock rods 19B, 19R, and 19E are exposed to the exterior and in which the knock rods 19B, 19R, and 19E can be moved in the axial direction.

Like a known multi-color ball-point pen, the electronic pen 10X is configured as follows. When one of the knock rods 19B, 19R, and 19E is slid toward the opening 11Ma side, resulting in a state in which the tip of the core body 1 of one of the electronic pen cartridges 9B, 9R, and 9E that is fitted to the knock rod thus slid is protruded to the outside through the opening 11Ma, a locking portion (omitted from illustration) of the knock rod 19B, 19R, or 19E is engaged with an engaging portion formed in the hollow part of the casing 11M, resulting in a locked state in which this engaged state is locked.

In the locked state, when another knock rod is moved sliding toward the opening 11Ma side, the locking of the knock rod in the locked state is released, and this knock rod is returned into its original state depicted in FIG. 7A by one of the coil springs 18B, 18R, and 18E. Then, the knock rod moved sliding later can be put into a locked state in a state wherein the tip of the core body 1 of that one of the electronic pen cartridges 9B, 9R, and 9E which is fitted to the knock rod is protruded to the outside through the opening 11Ma.

Subsequently, in the same manner, by putting the knock rod into sliding movement, the electronic pen cartridge of which the tip is protruded through the opening 11Ma can be changed. When the sliding movement of one of the knock rods 19B, 19R, and 19E is stopped in the course of reaching a locked state, locking of another knock rod which is in a locked state is released, and this knock rod is returned into the protected state of FIG. 7A by one of the coil springs 18B, 18R, and 18E.

FIGS. 7B and C are figures for explaining the switch provided in the electronic pen cartridges 9B, 9R, and 9E. FIGS. 7B and C depict the switch provided in the electronic pen cartridge 9B, and similar configuration is applied also to the other electronic pen cartridges 9R and 9E.

Specifically, a through-hole 91Ba is provided in a peripheral surface of that part of the cartridge casing 91B which is just accommodated in the through-hole 17B of the spring receiving member 17 when the electronic pen cartridge 9B is fitted to the fitting section 19Ba of the knock rod 19B being in a non-locked state; in addition, a switch member 50B is provided inside the cartridge casing 91B in such a manner that part thereof is exposed through the through-hole 91Ba in this instance.

The switch member 50B includes a material which has elasticity and conductivity, for example, a conductive metal having elasticity. As depicted in FIGS. 7B and C, the switch member 50B includes a fixed terminal piece 51 fixed to an inner wall surface in the vicinity of the through-hole 91Ba of the cartridge casing 91B, and a movable terminal piece 52 capable of making elastic contact with the fixed terminal piece 51. The movable terminal piece 52 has a bent portion 52a configured to be able to assume a state of elastic contact with the fixed terminal piece 51 and a non-contact state, and is mounted in the cartridge casing 91B in such a manner that part of the bent portion 52a can protrude through the through-hole 91Ba.

When the electronic pen cartridge 9B is fitted to the fitting section 19Ba of the knock rod 19B being in a non-locked state and is in a protected state in which the electronic pen cartridge 9B is entirely present in the hollow part of the casing 11M, the switch member 50B is just located in the through-hole 17B of the spring receiving member 17, as illustrated in FIG. 7B. Therefore, the bent portion 52a of the movable terminal piece 52 is elastically displaced to the inside of the cartridge casing 91B by the inner wall of the through-hole 17B, so that the fixed terminal piece 51 and the movable terminal piece 52 come into a separate state of not making contact with each other. In other words, the switch member 50B comes into an OFF state.

When the knock rod 19B is moved sliding into a locked state to result in a non-protected state in which the tip of the core body 1 of the electronic pen cartridge 9B is protruded through the opening 11Ma of the casing 11M, the switch member 50B comes into a state of being released from the through-hole 17B of the spring receiving member 17, as illustrated in FIG. 7C. Then, part of the bent portion 52a of the movable terminal piece 52 is elastically displaced to protrude through the through-hole 91Ba, whereby the movable terminal piece 52 and the fixed terminal piece 51 are put into a state of making contact with each other. In other words, the switch member 50B comes into an ON state.

The fixed terminal piece 51 and the movable terminal piece 52 of the switch member 50B are electrically connected to the IC 42 on the circuit board 4 accommodated in the cartridge casing 91B. The IC 42 has a function as a control circuit, and monitors the ON/OFF state of the switch member 50B, thereby to detect whether the current state is the protected state in which the electronic pen cartridge 9B is wholly present in the hollow part of the casing 11M, or the non-protected state in which the tip of the core body 1 of the electronic pen cartridge 9B is protruded from the opening 11Ma of the casing 11M by the knock rod 19B.

In the electronic pen cartridges 9R and 9E, also, switch members 50R and 50E (omitted from illustration) are provided in the cartridge casings 91R and 91E, and are connected to the ICs 42 on the circuit boards 4 accommodated in the cartridge casings 91R and 91E, similarly. In the case of this example, when the switch member 50B, 50R, or 50E of the electronic pen cartridge 9B, 9R, or 9E is put into the ON state to result in the non-protected state, the connection between the electronic parts mounted on the circuit board 4 is turned ON, whereby a function is performed. By this, transfer of signals between the electronic pen 10X and the position detecting device side is enabled.

In the case of the present embodiment, the position detecting device used together with the electronic pen cartridges 9B, 9R, and 9E has a function of receiving identification information transmitted individually from the electronic pen cartridges 9B, 9R, and 9E and discriminating them. Specifically, the position detecting device in the case of the present embodiment discriminates the differences among the electronic pen cartridges 9B, 9R, and 9E, and causes functions assigned individually to the electronic pen cartridges 9B, 9R, and 9E to be realized.

For instance, the electronic pen cartridge 9B is assigned a function of expressing in black a calligraphy (character or figure) displayed according to an indicated position thereof, while the electronic pen cartridge 9R is assigned a function of expressing in red a calligraphy displayed according to an indicated position thereof, and the electronic pen cartridge 9E is assigned a function of erasing a calligraphy previously inputted for indication according to an indicated position thereof.

Therefore, identification (ID) memories for storing the identification information of the electronic pen cartridges 9B, 9R, and 9E, data for informing the character colors, and data for informing the erasing function are mounted on the circuit boards 4 mounted individually in the electronic pen cartridges 9B, 9R, and 9E. Besides, the ICs 42 on the circuit boards 4 mounted individually in the electronic pen cartridges 9B, 9R, and 9E are capable of transmitting signals to the position detecting device according to these data.

Note that the functions assigned to the electronic pen cartridges may not be limited to display colors of the calligraphy according to the indicated position as in this example, but may be the thickness of the calligraphy, the kind of line such as a solid line, a dotted line, an alternate long and short dash line and the like.

Meanwhile, while the pen pressure detector is provided in the core body side member in the aforementioned embodiment, this is not restrictive, and the pen pressure detector may be provided on the side opposite to the core body 1. FIGS. 8A, 8B, and 8C are figures for explaining an example in a case where the pen pressure detector is provided on the side opposite to the core body 1. FIG. 8A depicts a general configuration of an electronic pen main body section 8A in this example.

As illustrated in FIG. 8A, the electronic pen main body section 8A in this example has a core body 1, a cylindrical coil section 2A, and a cylindrical connection section 34. The connection section 34 has a fitting section 34a for fitting to a board protecting pipe 6, and can be connected also to a circuit board 4 through the fitting section 34a. Note that the circuit board 4 and the board protecting pipe 6 are configured similarly to those in the electronic pen main body section 8 described using FIGS. 1 to 5.

FIG. 8B is a sectional view of a connection part between members of the electronic pen main body section 8A in this example. As depicted in FIG. 8B, the coil section 2A is configured by winding a coated wire 22B around a ferrite 21A provided with recesses on the sides of both ends in the axial direction thereof. Of the recesses provided in the ferrite 21A, the recess on one side is for holding the core body 1, and the recess on the other side is for fitting to a projected portion of the connection section 34.

The connection section 34 is formed from a resin, a rigid rubber or the like, is provided on one side in the axial direction with the projected portion for fitting to the recess on the other side of the ferrite 21A, and is provided on the other side with a fitting section 34a for fitting to the board protecting pipe 6. The fitting section 34a has an outside diameter which is slightly larger than the inside diameter of the board protecting pipe 6 but is smaller than the outside diameter of the board protecting pipe 6, like in the case of the electronic pen main body section 8 described above.

When the board protecting pipe 6 is fitted to the fitting section 34a, a tip-side end face of the board protecting pipe 6 is joined to an end face of the connection section 34 formed on the fitting section 34a side of the connection section 34. In addition, the fitting section 34a of the connection section 34 is provided therein with a recess into which a projected portion 4a of the circuit board 4 is fitted. As depicted in FIG. 8B, this recess has a depth comparable to the length in the axial direction of the projected portion 4a of the circuit board 4.

Therefore, as depicted in FIG. 8B, the core body 1 is fixed by being fitted into the recess on one side of the ferrite 21A, whereas the projected portion of the connection section 34 is fixed by being fitted into the recess on the other side of the ferrite 21A. Further, the projected portion 4a of the circuit board 4 is fixed by being fitted into the recess provided in the fitting section 34a of the connection section 34. The circuit board 4 is accommodated in the board protecting pipe 6, and the fitting section 34a of the connection section 34 is fixed by being fitted into a core body side opening 61 of the board protecting pipe 6. Note that both end terminals 23A and 23B of a coil wound around the ferrite 21A are connected to the circuit board 4, and a capacitor 44 and the like on the circuit board 4 are connected thereto, to constitute a resonance circuit. In addition, a board receiving base 5 is also provided in the board protecting pipe 6, like in the case of the electronic pen main body section 8 described above.

Besides, in the case of the electronic pen main body section 8A in this example, a pen pressure detector 14 is provided at a rear end on the side opposite to the core body 1 side. FIG. 8C is a sectional view of the part of the pen pressure detector 14. As depicted in FIG. 8C, the electronic pen main body section 8A in this example is separated into a part (first part) on which the circuit board 4 is mounted, and a stationary part 13 (second part) to which a coupling rod member 141 is fixed. A pressure-sensing part 15 for pen pressure detection is provided at an end, on the side opposite to the core body 1 side, of the circuit board 4. The pressure-sensing part 15 is pressed by the coupling rod member 141 fixed to the stationary part 13.

In addition, a coil spring 142 is provided between the part (first part) on which the circuit board 4 is mounted and the stationary part 13 (second part) to which the coupling rod member 141 is fixed. By this, the first part and the second part are elastically displaced so as to be spaced away from each other in the axial direction. However, as depicted in FIG. 8C, the coupling rod member 141 is provided with a stopper 141b inside a part on which the circuit board 4 is mounted, such that the first part and the second part are locked at a predetermined position, whereby they are prevented from being displaced further in the axial direction.

The electronic pen main body section 8A configured in this way is, for example, accommodated in the casing 11 as depicted in FIG. 1, to be used as an electronic pen; in this instance, a surface of the stationary part 13 on the side opposite to a surface to which the coupling rod member 141 is fixed is fixed by making contact with a locking wall provided inside a rear end of the casing 11. When a pen pressure is exerted on the core body 1 of the electronic pen main body section 8A accommodated in the casing 11, the whole of the interconnected core body 1, the coil section 2A, the connection section 34, and the circuit board 4 and the board protecting pipe 6 is pushed up, and the tip 141a of the coupling rod member 141 presses the pressure-sensing part 15. By this, the pen pressure can be detected at the pressure-sensing part 15, and a signal according to the thus detected pen pressure can be supplied to the IC 42 provided on the circuit board 4.

[Application to Electronic Pen of Capacitive Coupling System]

Figure 9:
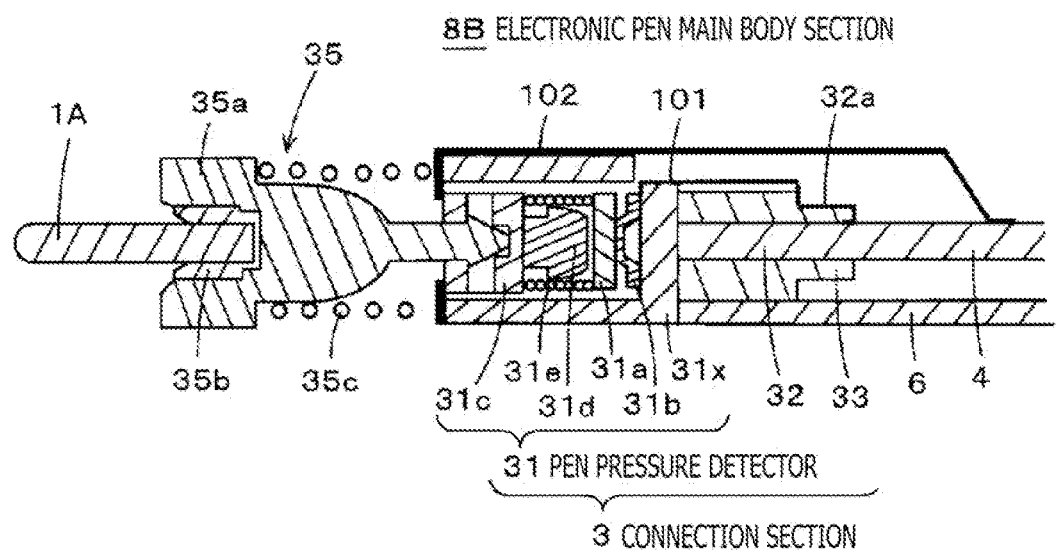
FIG. 9 is a sectional view for explaining an example in a case where the present disclosure is applied to an electronic pen main body section of a capacitive coupling system.

While the electronic pen main body sections 8 and 8A in the embodiments described above have been of the electromagnetic resonance system, the present disclosure is applicable also to the case where an electronic pen main body section of a capacitive coupling system is configured. FIG. 9 is a sectional view for explaining an example in a case where the present disclosure is applied to an electronic pen main body section of a capacitive coupling system, and depicts a connected state of component members on the core body side.

As illustrated in FIG. 9, an electronic pen main body section 8B in this example includes a core body 1A, a core body holding section 35, a connection section 3, a circuit board 4, and a board protecting pipe 6. The connection section 3 is a section including a pen pressure detector 31, a fitting section 32, and a connection terminal section 33, like in the case of the electronic pen main body section 8 described above. The pen pressure detector 31, the fitting section 32, and the connection terminal section 33, as well as the circuit board 4 and the board protecting pipe 6 are configured similarly to the case of the electronic pen main body section 8 described above, and, therefore, detailed descriptions thereof are omitted here.

In the case of the electronic pen main body section 8B in this example, the core body holding section 35 is provided in place of the coil section 2. The core body holding section 35 includes a core body holder 35a, a conductive elastic member 35b, and a coil spring 35c as an elastic member. The core body 1A is fitted to the core body holder 35a formed of a conductive material through the conductive elastic member 35b, whereby the core body 1A is coupled to and held by the core body holder 35a. As depicted in FIG. 9, the core body holder 35a is fitted to a holding member 31c of the pen pressure detector 31, whereby a pressure (pen pressure) exerted on the core body 1A is transmitted to a pressure-sensing part configured in the pen pressure detector 31.

In this case, the core body holder 35a is configured to be constantly biased toward the core body 1A side relative to the pen pressure detector 31 by a coil spring 35c, which is an example of an elastic member formed of a conductive material such as a conductive metal and which is provided between the core body holder 35a and the pen pressure detector 31. Note that the coil spring 35c is connected to an electronic circuit including an IC 42, a side switch 43, capacitors 44 to 49 and the like disposed on the circuit board 4 via a conductor terminal member 102. By this, a signal from the IC 42 can be transmitted to the core body 1A, and can be transmitted from the core body 1A to a position detecting device.

In addition, signal wires extending from terminal members of the pressure-sensing part configured in the pen pressure detector 31 are connected to connection terminals 33a and 33b of the connection terminal section 33. The connection terminals 33a and 33b are connected to terminals 41a and 41b of the circuit board 4, in the case where the circuit board 4 is inserted into the fitting section 32 and the connection terminal section 33, as also aforementioned. The terminals 41a and 41b of the circuit board 4 are connected to the electronic circuit including the IC 42, the side switch 43, the capacitors 44 to 49 and the like on the circuit board 4, and a detection output from the pressure-sensing part is supplied to the IC 42 on the circuit board 4 through the terminals 33a and 33b and the terminals 41a and 41b. By this, the pen pressure can be detected at the IC 42, and a signal according to the pen pressure can be transmitted through the core body 1A to the position detecting device.

In the case of the electronic pen main body section 8B depicted in FIG. 9, also, connection of the connection section 3 with the circuit board 4 and the board protecting pipe 6 is conducted similarly to the case of the electronic pen main body section 8 described above. By this, in the case of the electronic pen main body section 8B of the capacitive connection system, also, the circuit board 4 can be protected by the board protecting pipe 6. Moreover, since the circuit board 4 can be firmly connected in series with the core body 1A, the core body holding section 35, and the connection section 3, it is possible to configure an electronic pen main body section 8B of the capacitive system that is high in strength against external pressures.

[Outline of Position Detecting Device of Capacitive Coupling System]

Figure 10:
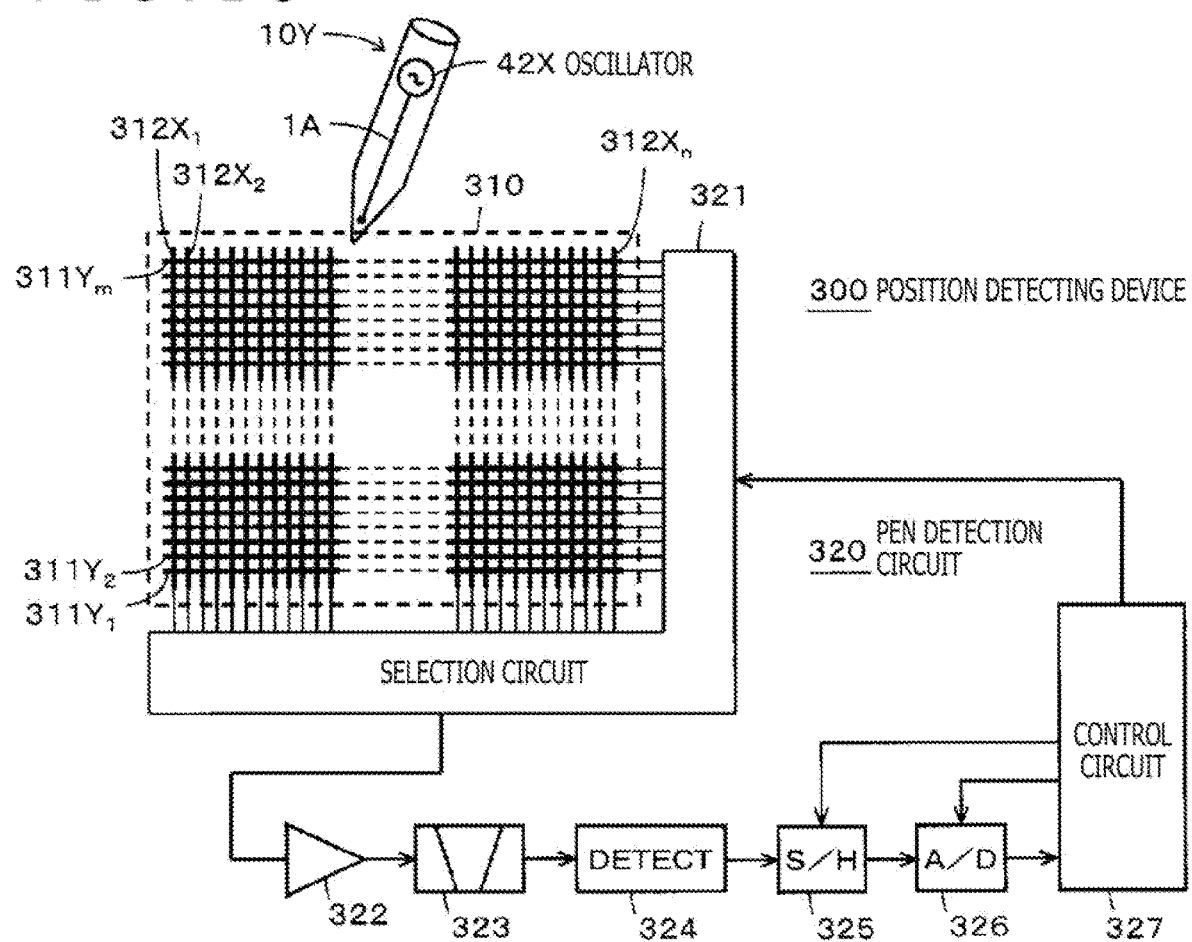
FIG. 10 is a block diagram for explaining a position detecting device in which a coordinate detection sensor of a capacitive coupling system is used.

FIG. 10 is a block diagram for explaining a position detecting device 300 in which is used a coordinate detection sensor of a capacitive coupling system for receiving a signal from an electronic pen 10Y configured by use of the electronic pen main body section 8B depicted in FIG. 9, for detecting a position on the sensor, and for detecting a pen pressure and the state of a side switch.

As depicted in FIG. 10, the position detecting device 300 in this example includes a coordinate sensor (hereinafter referred to simply as sensor) 310 of the capacitive coupling system, and a pen detection circuit 320 connected to the sensor 310. In this example, though a sectional view is omitted, the sensor 310 is formed by stacking a first conductor group 311, an insulating layer (omitted from illustration), and a second conductor group 312 in this order from the lower layer side. The first conductor group 311 has a configuration wherein, for example, a plurality of first conductors 311Y1, 311Y2, . . . , 311Ym (m is a positive integer) extending in a horizontal direction (X-axis direction) are disposed in parallel at a predetermined interval in a Y-axis direction. In addition, the second conductor group 312 extends in a vertical direction (Y-axis direction) orthogonal to the first conductor group 311 and are disposed in parallel at a predetermined interval in the X-axis direction.

Thus, in the sensor 310 of the position detecting device 300, a configuration is provided wherein a position indicated by an electronic pen is detected using a sensor pattern formed by arranging the first conductor group 311 and the second conductor group 312 in an intersecting manner. Note that in the following description, where it is unnecessary to discriminate respective ones of the first conductors 311Y1, 311Y2, . . . , 311Ym from one another, the conductors will be referred to as first conductor 311Y. Similarly, where it is unnecessary to discriminate respective ones of the second conductors 312X1, 312X2, . . . , 312Xn from one another, the conductors will be referred to as second conductor 312X.

The pen detection circuit 320 includes a selection circuit 321 used as an input/output interface for the sensor 310, an amplification circuit 322, a band-pass filter 323, a detection circuit 324, a sample hold circuit 325, an AD conversion circuit 326, and a control circuit 327.

The selection circuit 321 selects one conductor 311Y or 312X from among the first conductor group 311 and the second conductor group 312, based on a control signal from the control circuit 327. The conductor selected by the selection circuit 321 is connected to the amplification circuit 322, a signal from the electronic pen 10Y is detected by the selected conductor, and it is amplified by the amplification circuit 322. An output of the amplification circuit 322 is supplied to the band-pass filter 323, where only a component of the frequency of the signal transmitted from the electronic pen 10Y is extracted.

An output signal of the band-pass filter 323 is detected by the detection circuit 324. An output signal from the detection circuit 324 is supplied to the sample hold circuit 325, where it is sample-held at a predetermined timing by a sampling signal from the control circuit 327, and is thereafter converted into a digital value by the AD conversion circuit 326. Digital data from the AD conversion circuit 326 is read and processed by the control circuit 327.

The control circuit 327 operates to output control signals to the sample hold circuit 325, the AD conversion circuit 326, and the selection circuit 321, based on a program stored in a read-only memory (ROM) provided therein. Besides, the control circuit 327 calculates coordinates of a position on the sensor 310 indicated by the electronic pen 10Y, from the digital data sent from the AD conversion circuit 326. Furthermore, the control circuit 327 detects a pen pressure detected by the pen pressure detector 31 including a pressure-sensing part and the like of the electronic pen 10Y, and the state of the side switch 43 of the electronic pen 10Y.

Note that in the electronic pen 10Y in this example, a signal generation circuit 42X of an IC 42 on a circuit board 4 is composed only of an oscillation circuit, and the pen pressure and ON/OFF of the side switch are transmitted to the position detecting device as variations in oscillation frequency. However, this is not restrictive. The signal generation circuit may include an oscillation circuit and a circuit for applying a predetermined modulation to an oscillation signal from the oscillation circuit, and pen pressure information and information indicative of the ON/OFF of the side switch may be transmitted to the position detecting device as, for example, an amplitude shift keying (ASK) signal or the like.

[Modifications of Board Protecting Pipe]

Note that in the electronic pen main body sections 8, 8A, and 8B in the embodiments described above, the board protecting pipe 6 has been provided with the opening 63 formed in the manner of cutting away a part of a side wall of the board protecting pipe 6 in such a manner as to connect the core body side opening 61 and the rear end side opening 62, as described using FIGS. 2A and 2B. The opening 63 is a side opening in a direction along the axial direction, and can be called a window or cutout provided in the side surface of the board protecting pipe 6. However, this is not restrictive.

Figure 11A:
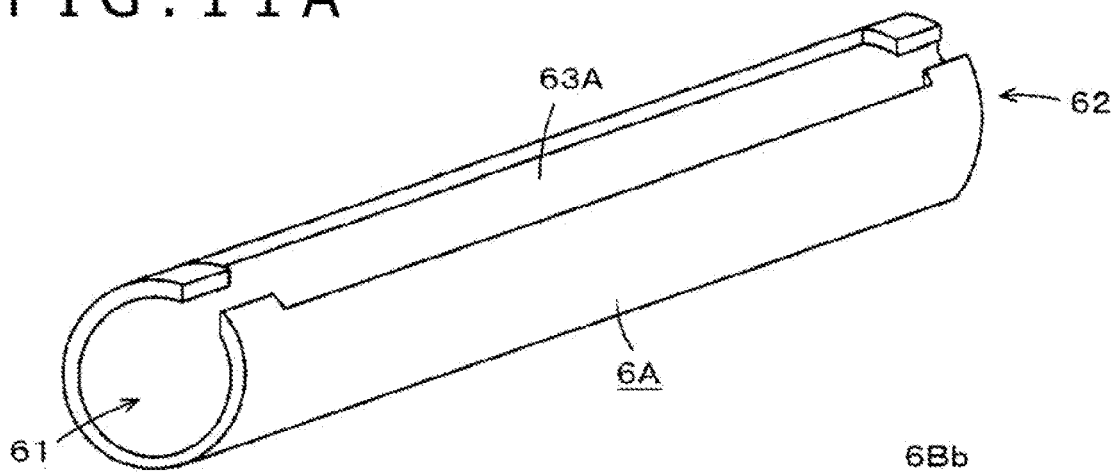
FIGS. 11A, 11B, and 11C are figures for explaining modifications of the board protecting pipe.
Figure 11B:
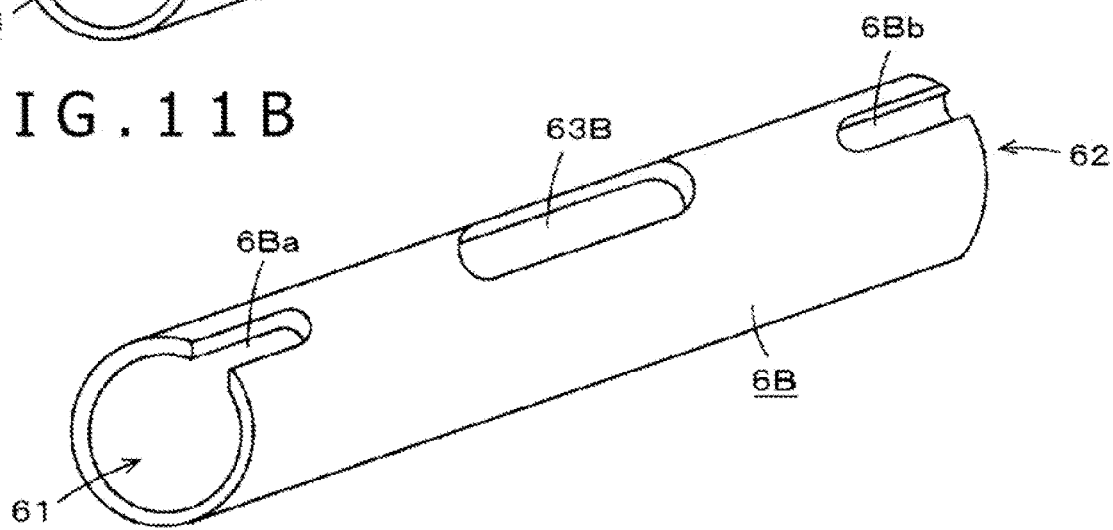
Figure 11C:
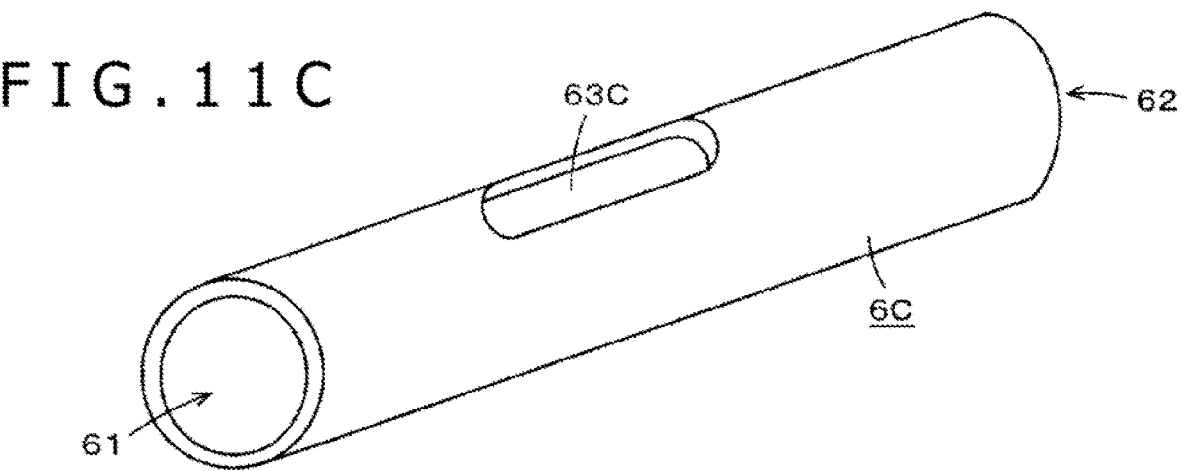

FIGS. 11A, 11B, and 11C are figures for explaining modifications of the board protecting pipe 6. For example, a board protecting pipe 6A in Modification 1 depicted in FIG. 11A has an opening 63A formed in the manner of cutting away a part of a side wall of the board protecting pipe 6 in such a manner as to connect the core body side opening 61 and the rear end side opening 62. However, as depicted in FIG. 11A, at the parts of the core body side opening 61 and the rear end side opening 62, portions where the width of the opening is narrowed may be provided. By such a configuration, fitting to the fitting section 32 of the connection section 3 and fitting to the pipe cap 7 can be made to be firmer.

In addition, a board protecting pipe 6B in Modification 2 depicted in FIG. 11B is provided with a required minimum opening 63B at such a position that an operation on the side switch 43 on the circuit board 4 and a work of, for example, cutting the connection of capacitors constituting the resonance circuit together with a coil by laser can be performed. The opening 63B is a so-called window wherein the opening range is a closed range surrounded by the side surface of the board protecting pipe 6B. In addition, at the parts of the core body side opening 61 and the rear end side opening 62, there are provided cutouts 6Ba and 6Bb which are openings wherein a part of the opening range is an open range not surrounded by the side surface of the board protecting pipe 6B. The cutouts 6Ba and 6Bb are for ensuring that fitting to the fitting section 32 of the connection section 3 and fitting to the pipe cap 7 can be carried out easily, without lowering the degree of fitting.

In the case of Modification 2 depicted in FIG. 11B, the parts of the opening 63B and the cutouts 6Ba and 6Bb are narrower than the opening 63 of the board protecting pipe 6 depicted in FIGS. 2A and 2B, and the opening 63A of the board protecting pipe 6A depicted in FIG. 11A. Therefore, the board protecting pipe 6B is high in strength, and can protect the circuit board 4 firmly, as compared to the board protecting pipe 6 depicted in FIGS. 2A and 2B, and the board protecting pipe 6A depicted in FIG. 11A.

Besides, a board protecting pipe 6C in Modification 3 depicted in FIG. 11C is of a type wherein an opening 63C as a window is only provided, without providing the cutouts 6Ba and 6Bb possessed by the board protecting pipe 6B of Modification 2 depicted in FIG. 11B. In the case of the board protecting pipe 6C, the strength of the board protecting pipe 6C itself can be enhanced as compared to the board protecting pipe 6B depicted in FIG. 11B, by an extent according to the absence of the cutouts 6Ba and 6Bb.

[Electronic Pen Provided with Other Switch than Side Switch]

In addition, in the case of the electronic pen main body section 8 in the embodiment described above, the side switch 43 has been provided. The side switch 43 realizes a function similarly to that of a click button possessed by a so-called mouse. For example, when the side switch 43 is depressed once (when one click is made), an operation of moving a cursor to the depression position may be performed, and, when the side switch 43 is depressed twice successively (when double click is made), an operation of opening a predetermined window may be performed.

Other than this, there may be a case where it is desired to use one electronic pen by changing over its function, for example, between use of the electronic pen for drawing and use of the electronic pen as a so-called eraser for erasing information that has been drawn. In view of this, in the case of the electronic pen in the present embodiment, a function changing-over switch, for example, can be easily configured.

Figure 12:
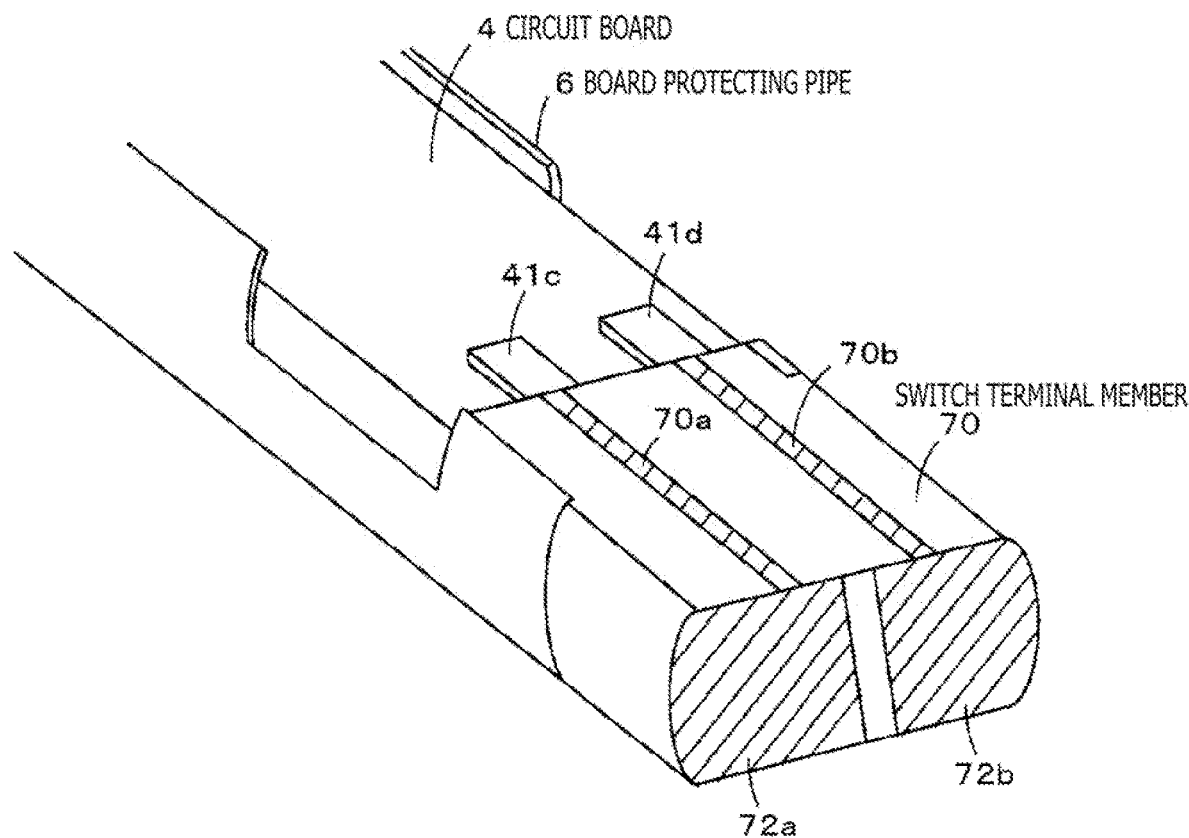
FIG. 12 is a figure for explaining an example in a case where a circuit board is formed with switch terminals.

FIG. 12 is a figure for explaining an example in a case where a circuit board 4A is formed with a switch terminal. The circuit board 4A in this example is also configured basically in similar manner to the circuit board 4 depicted in FIGS. 2A and 2B; function changing-over switch terminals 41c and 41d are provided at the part of an end on the side opposite to the core body 1 side, in similar manner to the terminals 41a and 41b have been provided at the part of an end on the core body 1 side. These switch terminals 41c and 41d are connected to an IC 42 that functions as a control circuit.

In this condition, however, it is difficult to provide a mechanism for turning ON/OFF the switch terminals 41c and 41d. In this example, therefore, a so-called socket-type switch terminal member 70 is provided, as depicted in FIG. 12. The switch terminal member 70 has a shape as if obtained by flattening the pipe cap 7 depicted in FIG. 2A, and is thicker than the circuit board 4A. Besides, the switch terminal member 70 is provided on one end side thereof with a recess for fitting to the circuit board 4A, and is provided on the other end side thereof with terminals 72a and 72b which are formed of a conductive material and constitute switch terminals.

In addition, the side of the circuit board 4A on which the terminals 41c and 41d are provided is inserted and fitted into the recess of the switch terminal member 70. In this case, the terminal 41c of the circuit board 4A and the terminal 72a of the switch terminal member are connected to each other through a conductive connection member 70a, whereas the terminal 41d of the circuit board 4A and the terminal 72b of the switch terminal member are connected to each other through a conductive connection member 70b. Such a configuration is a configuration similarly to the configuration of connection between the connection terminal section 33 and the side of the circuit board 4 on which the terminals 41a and 41b for the core body 1 are provided, as described using FIG. 2A. Besides, the switch terminal member 70 is fitted also to an end of the board protecting pipe 6, and, together with the board protecting pipe 6, can hold the circuit board 4A in the board protecting pipe 6.

Thus, an electronic pen main body section 8 with switch terminals can be configured so as to have a similar configuration to the electronic pen main body section 8 described using FIGS. 1 to 4, except that the circuit board 4A is provided with the terminals 4c and 4d and that the switch terminal member 70 is provided. In addition, the switch terminals 41c and 41d provided on the circuit board 4A are led to the terminals 72a and 72b provided at an end surface of the switch terminal member 70, whereby a switch can be configured easily. Specifically, a switch can be configured which is put into an ON state when the terminal 72a and the terminal 72b are connected to each other, and which is put into an OFF state when the terminal 72a and the terminal 72b are not connected.

Figures 13A, 13B:
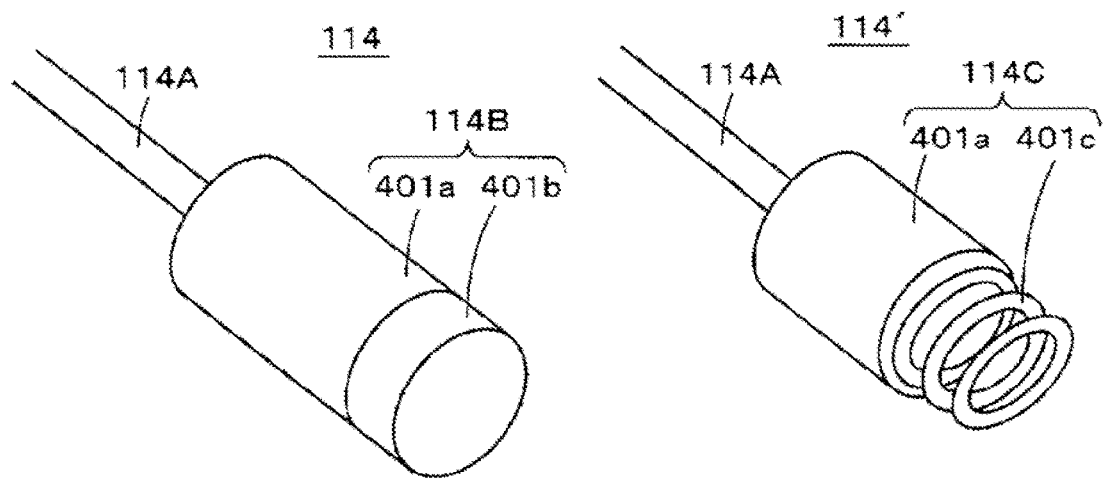
FIGS. 13A and 13B are figures for explaining a general configuration of a sliding member for changing over a switch.

For this reason, a knock type mechanism of a ball-point pen is utilized, such that connection/non-connection between the terminal 72a and the terminal 72b can be changed over every time a knock is made. FIGS. 13A and 13B are figures for explaining the configuration of a sliding member 114 for changing over the connection/non-connection between the terminal 72a and the terminal 72b by utilizing the knock type mechanism of a ball-point pen. As depicted in FIG. 13A, the sliding member 114 includes a rod-shaped body 114A connected to the knock type mechanism, and a pusher member 114B for pushing the terminals 72a and 72b. The pusher member 114B includes a main body section 401a formed of an elastic material such as rubber, and a metal member 401b adhered to that surface of the main body section 401a which faces the terminals 72a and 72b.

The sliding member 114 configured in this way is moved upwardly and downwardly within the electronic pen casing in the manner of interlocking with a knock-type cam mechanism, whereby the connection/non-connection between the terminal 72a and the terminal 72b can be changed over. FIGS. 14A and 14B are figures for explaining a knock-type mechanism part provided on a rear case section 104 side of an electronic pen 100 in this example, wherein FIG. 14A is a figure depicting a state in which a knock rod 110 is not depressed, whereas FIG. 14B is a figure depicting a state in which the knock rod 110 is depressed. The electronic pen 100 in this example has a configuration wherein switch terminals are formed by the circuit board 4A provided with the switch terminals 41c and 41d and the switch terminal member 70, as described using FIG. 12, and has the sliding member 114 described using FIGS. 13A and 13B.

The knock type mechanism of the electronic pen 100 in the present embodiment is configured similarly to a knock cam mechanism of a knock-type ball-point pen used as a writing utensil, has a configuration wherein a knock rod 110, a rotor 111, a cam main body 112, and a return coil spring 113 are combined together, and includes a locking mechanism. A detailed configuration of the knock cam mechanism of a knock-type ball-point pen and the operation thereof are known, and, therefore, descriptions thereof are omitted here.

In the electronic pen 100 in the present embodiment, the knock rod 110 includes a first rod-shaped part 110b which has a circular cross section (the cross section is a section in a direction orthogonal to the axial direction, here and hereafter) according to the cross section of a hollow part of the rear case section 104 and has a cross section slightly smaller than the cross section of the hollow part, a second rod-shaped part 110a which is formed integral with the first rod-shaped part 110b and which constitutes a part for linking with the rotor 111, and a flange part 110c formed at that end face of the first rod-shaped part 110b which is on the side opposite to the side of coupling with the second rod-shaped part 110a. In addition, the knock rod 110 is accommodated in the rear case section 104 in a state in which part of the first rod-shaped part 110b constituting a part of the knock rod 110 and the flange part 110c protrude to the outside from an opening 104b of the rear case section 104, in such a manner as to be able to slidingly move in the axial direction within the hollow part of the rear case section 104, in response to a user's knocking operation (depressing operation). The knock rod 110 constitutes a protruding part.

The flange part 110c is formed in such a manner that a step is generated between itself and the first rod-shaped part 110b, and, in this example, the shape and size of the cross section of the flange part 110c are the same as the outer peripheral shape and size of the cross section of the rear case section 104.

The cam main body 112 is formed at an inner wall surface of the rear case section 104, and is so configured as to mesh with the rotor 111. As the knock rod 110 slidingly moves in the axial direction, the rotor 111 moves in the axial direction within the hollow part of the rear case section 104 and rotates, whereby the state of meshing thereof with the cam main body 112 is changed. As a result, a knocking action is performed according to a knocking operation on the knock rod 110.

In the present embodiment, the sliding member 114 is coupled to the rotor 111. The sliding member 114 includes a rod-shaped body 114A and a pusher member 114B, with the pusher member 114B attached to one end side of the sliding member 114, and with the other end side of the sliding member 114 fitted and attached to a fitting section (omitted from illustration) provided in the rotor 111.

In this case, the rod-shaped body 114A and the pusher member 114B are configured to have such lengths as to ensure the following. When the knock rod 110 is not depressed, as depicted in FIG. 14A, no force in the axial direction is exerted, so that the metal member 401b of the pusher member 114B does not connect the terminals 72a and 72b of the switch terminal member 70. However, when the knock rod 110 is depressed as depicted in FIG. 14B, a force in the axial direction is exerted, and the metal member 401b of the pusher member 114B makes contact with the terminals 72a and 72b of the switch terminal member 70, so as thereby to connect both the terminals 72a and 72b.

The return coil spring 113 of the knock cam mechanism is mounted in the state of being fitted over the rod-shaped body 114A of the sliding member 114, and can be contracted and expanded between an end face in the axial direction of the rotor 111 and a return coil spring locking section 115 provided in the rear case section 104.

Specifically, when the flange part 110c side of the knock rod 110 is depressed in the state of FIG. 14A, a locked state is established wherein the knock rod 110 is locked in a state of FIG. 14B in which the flange part 110c of the knock rod 110 is located in the vicinity of an end of the opening 104b of the rear case section 104, by an operation of the knock cam mechanism including the rotor 111 and the cam main body 112 according to a sliding movement in the axial direction of the knock rod 110.

In this instance, the metal member 401b of the pusher member 114B connects the terminals 72a and 72b of the switch terminal member 70, whereby the switch is put into an ON state. Note that in this instance a fitting hole 110d formed in the first rod-shaped part 110a of the knock rod 110 is engaged with an engaging projection (omitted from illustration) formed at an inner wall of the hollow part of the rear case section 104, whereby the knock rod 110 is locked in the state of FIG. 14B.

When the flange part 110c side of the knock rod 110 is again depressed from the state of FIG. 14B, the locked state is released by the knock cam mechanism including the rotor 111 and the cam main body 112, and the knock rod 110 and the rotor 111 are moved sliding in the axial direction such as to return into the state of FIG. 14A, by the return coil spring 113, and are locked in the state of FIG. 14A. In this instance, a fitting hole 110e formed in the second rod-shaped body 110a of the knock rod 110 is engaged with an engaging projection (omitted from illustration) formed at the inner wall of the hollow part of the rear case section 104, and the knock rod 110 is locked in the state of FIG. 14A.

According to the return of the knock rod 110 and the rotor 111 into the state of FIG. 14A, the rod-shaped body 114A and the pusher member 114B are returned into a state in which the metal member 401b of the pusher member 114B does not make contact with the terminals 72a and 72b of the switch terminal member 70, as depicted in FIG. 14A, whereby the switch is put into an OFF state.

Note that a pusher member 114C may be formed in which as depicted in FIG. 13B, a spring-shaped metal member 401c is used in place of the metal member 401b of the pusher member 114B depicted in FIG. 13A. The spring-shaped metal member 401c in this example is formed by processing a linear metal member into a circular helical shape such as to have an elastic force. By this, it is ensured that by bringing the spring-shaped metal member 401c into simultaneous contact with the terminals 72a and 72b of the switch terminal member 70, both the terminals can be short-circuited. Further, the spring-shaped metal member 401c plays the role of absorbing an excessive force, which may be exerted on the knock rod 110, in such a manner that an unrequired force is not exerted on the switch terminal member 70. Other than the above, various members having a conductive property and an elastic force may be used in place of the metal members 401b and 401c.

In the above-mentioned manner, a switch for changing over of functions, for example, can be easily configured by utilizing the switch terminal member 70 connected to the switch terminals 41c and 41d of the circuit board 4A and the knocking mechanism of a writing utensil. In this case, by using a so-called socket-type switch terminal member 70, the desired switch function can be mounted on the circuit board 4A with a comparatively simple configuration and without configuring a switch function of a complicated configuration.

[Simplification of Electrical Connection Between Coil Section and Pressure-Sensing Member and Circuit Board]

In the case of the electronic pen main body section 8 of the electromagnetic induction coupling system in the embodiment described using FIGS. 1 to 4B, the electrical connection between the coil 22 of the coil section 2 and the circuit board 4 and the electrical connection between the pressure-sensing part of the pen pressure detector 31 and the circuit board 4 have been conducted through separate routes. Specifically, the electrical connection between the pressure-sensing part of the pen pressure detector 31 and the circuit board 4 has been conducted by a method wherein the connection terminals 33a and 33b of the connection terminal section 33 to which the signal wires from the terminal members of the pressure-sensing part are connected and the terminals 41a and 41b of the circuit board 4 are connected. On the other hand, the electrical connection between the coil 22 of the coil section 2 and the circuit board 4 has been described to be conducted by directly connecting the extension wires 23a and 23b from both ends of the coil 22 to the circuit board 4.

Figure 15:
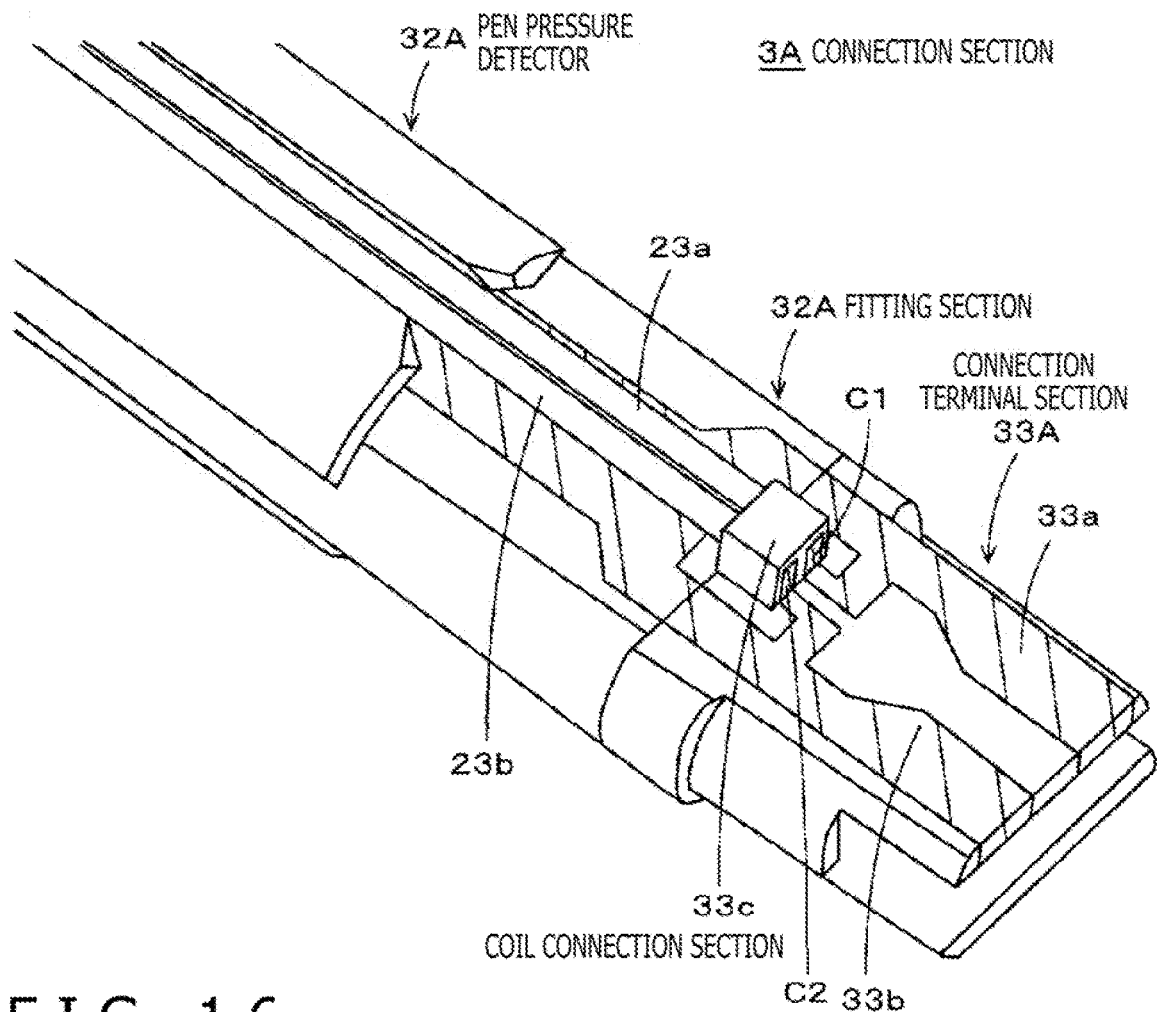
FIG. 15 is a figure for explaining another configuration example of the connection section.

The electrical connection between the coil 22 of the coil section 2 and the circuit board 4 and the electrical connection between the pressure-sensing part of the pen pressure detector 31 and the circuit board 4 can be performed through the same route. FIG. 15 is a figure for explaining the configuration of a connection section (connection member) 3A in this example, for performing the electrical connection between the coil 22 of the coil section 2 and the circuit board 4 and the electrical connection between the pressure-sensing part of the pen pressure detector 31 and the circuit board 4 through the same route. The connection section 3A is a section including the pen pressure detector 31A, the fitting section 32A, and the connection terminal section 33A.

The pen pressure detector 31A, the fitting section 32A, and the connection terminal section 33A of the connection section 3A are basically configured similarly to the pen pressure detector 31A, the fitting section 32A, and the connection terminal section 33A of the connection section 3 of the electronic pen main body section 8 in the embodiment described using FIGS. 1 to 4. A difference lies in the mode of electrical connection with the coil 22.

As depicted in FIG. 15, the connection terminal section 33A includes upper and lower two plate portions, and the upper plate portion is provided with connection terminals 33a and 33b. These connection terminals 33a and 33b are extended toward the pen pressure detector 31 side, and are connected to terminal members of the pressure-sensing part of the pen pressure detector 31. Note that the connection terminals 33a and 33b are configured such that they can be automatically connected to the terminals 41a and 41b of the circuit board 4 when they are drawn around to the back side of the plate portion where they are provided and the circuit board 4 is connected to the connection terminal section 33A in a clamping manner. Thus, the configuration wherein the connection terminal section 33A is provided with the connection terminals 33a and 33b to be connected to the terminal members of the pressure-sensing part is similar to the connection section 3 of the electronic pen main body section 8 described above.

Further, the connection terminal section 33A of the connection section 3 in this example is provided with a coil connection section 33c, as depicted in FIG. 15. As depicted in FIG. 15, connection ends C1 and C2 formed of a conductor are provided, the connection end C1 is connected to the connection terminal 33a, whereas the connection end C2 is connected to the connection terminal 33b. Besides, both ends of the coil 22 of the coil section 2 are connected to the coil connection section 33c. Specifically, as depicted in FIG. 15, coating-deprived lead wire parts of extension wires (coated wires) 23a and 23b from both ends of the coil 22 of the coil section 2 are connected to the coil connection section 33c.

Note that the coil connection section 33c may have a configuration wherein two terminals each having a V-shaped locking groove (cut) are aligned. In this case, the V-shaped locking groove provided in the terminal is, for example, a groove formed in a tapered shape which is tapered from an upper portion toward a lower portion. Therefore, when the extension wire 22a or the extension wire 22b of the coil is pushed into the V-shaped locking groove of the terminal from an opening at an upper portion toward a lower portion, the extension wire 22a or the extension wire 22b can be fixed to the V-shaped locking groove of the terminal. Naturally, a configuration may be adopted wherein a terminal is provided with a cut whose inlet is cut in a V shape, and the extension wire 22a or the extension wire 22b of the coil 22 is clamped in the cut of the terminal.

By this, the lead wire of the extension wire 23a on one side of the coil 22 is connected to the connection end C1 of the coil connection section 33c, and the lead wire of the extension wire 23b on other side of the coil 22 is connected to the connection end C2 of the coil connection section 33c. Since the connection end C1 is connected to the connection terminal 33a and the connection end C2 is connected to the connection terminal 33b as aforementioned, the extension wire 23a on one side of the coil 22 is connected to the connection terminal 33a, and the extension wire 23b on the other side of the coil 22 is connected to the connection terminal 33b. In other words, output terminals of the pressure-sensing part of the pen pressure detector 31 and both ends of the coil 22 are connected to the connection terminals 33a and 33b of the connection terminal section 33A.

By this, in the case where the circuit board 4 is mounted in the manner of clamping between the two plate portions of the connection terminal section 33A, the connection terminals 33a and 33b of the connection terminal section 33A and the terminals 41a and 41b can be automatically connected. Since not only the output terminals of the pressure-sensing part but also both ends of the coil 22 are connected to the connection terminals 33a and 33b of the connection terminal section 33A, the pressure-sensing part of the pen pressure detector 31 and the coil 22 of the coil section 2 can be simultaneously connected to the electronic circuit formed on the circuit board 4.

Figure 16:
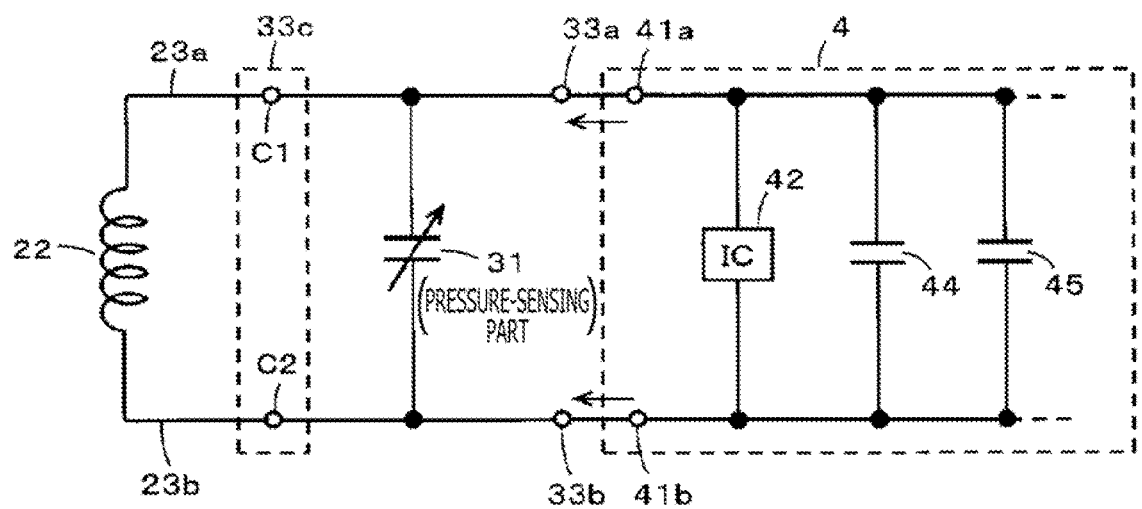
FIG. 16 is a figure depicting an example of an equivalent circuit of an electronic pen in a case where the connection section of FIG. 15 is used.

FIG. 16 is a figure depicting an example of an equivalent circuit in the case where an electronic pen main body section is configured using the connection section 3A depicted in FIG. 15. As depicted in FIG. 16, the extension wire 23a from one end of the coil 22 is connected to the connection end C1 of the coil connection section 33c, whereas the extension wire 23b from the other end of the coil 22 is connected to the connection end C2 of the coil connection section 33c.

The connection ends C1 and C2 are connected to the connection terminals 33a and 33b of the connection terminal section 33A to which the output terminals of the pressure-sensing part of the pen pressure detector 31 are connected. By this, when the circuit board 4 indicated by a dotted line is connected to the connection terminal section 33A, the connection terminal 33a and the terminal 41a of the circuit board 4 are connected, and the connection terminal 33b and the terminal 41b of the circuit board 4 are connected, as indicated by arrows. As a result, the coil 22 of the coil section 2 and the pressure-sensing part of the pen pressure detector 31A can be electrically connected, simultaneously and reliably, to the electronic circuit formed on the circuit board 4.

Note that in regard of the fitting section 32A and the connection terminals 33a and 33b provided in the connection terminal section 33A, of the connection section 3A, the fitting section 32A and the connection terminal section 33A are formed with the conductor patterns of a conductive material depicted in FIG. 15, for example, by use of various methods such as pressure joining, fusing, adhesion, or coating. In this case, on the pen pressure detector 31 side, the connection terminals 33a and 33b are formed in such a manner that they can be connected to the output terminals of the pressure-sensing part of the pen pressure detector 31 by only fitting the fitting section 32A and the connection terminal section 33A to the pen pressure detector 31. Besides, as depicted in FIG. 15, the coil connection section 33c provided with the connection ends C1 and C2 which are electrically connected to the connection terminals 33a and 33b is provided.

As a result, it is possible to form the connection section 3A for constituting the electronic pen main body section 8 such that the pressure-sensing part of the pen pressure detector 31 and the coil 22 of the coil section 2 can be connected to the circuit on the circuit board 4 easily and reliably, without involving an adhering operation such as soldering. By use of the connection section 3A, it is possible to realize an electronic pen main body section 8 which is extremely easy to assemble.

Note that an electronic circuit including an IC 42, capacitors 44, 45, . . . is depicted to be formed on the circuit board 4 in FIG. 16, the electronic circuit formed on the circuit board 4 can naturally take various configurations, such as providing a side switch or providing other capacitors.

[Others]

Figure 17A:
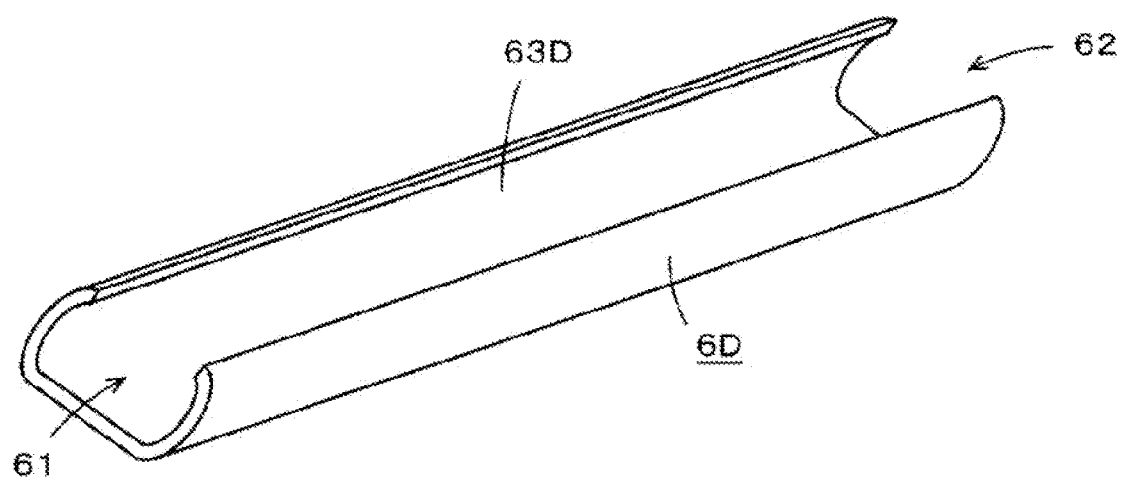
FIGS. 17A and 17B are figures for explaining an example of a board protecting pipe of a different shape.
Figure 17B:
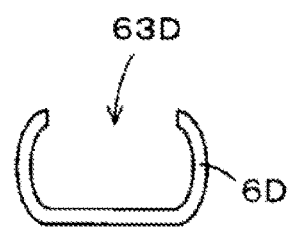

Note that the board protecting pipe 6 has been assumed to have a cylindrical shape in the aforementioned embodiment, this is not restrictive. A tubular body having a side wall which is polygonal in section may be used. FIGS. 17A and 17B are figures for explaining an example of a board protecting pipe which is polygonal in section in a direction intersecting the longitudinal direction thereof. A board protecting pipe 6D depicted in FIG. 17A has a shape which is not cylindrical but substantially prismatic. The board protecting pipe 6D is provided with a core body side opening 61 on the core body side thereof, is provided with a rear end side opening 62 on the rear end side thereof, and is provided with a large opening 63D in a side surface (on an upper surface side) thereof.

As depicted in FIG. 17B, a section in a direction intersecting the longitudinal direction of the board protecting pipe 6D has a flat bottom surface, and side walls which are somewhat rounded to outside. In the case of the board protecting pipe 6D having such a shape, there is a merit that, for example, the circuit board can be stably embraced and held by the board protecting pipe 6D. In addition, as a window (a side opening in a direction along the axial direction) provided in the board protecting pipe, a required number of windows having a required size can be provided at appropriate positions. Thus, the opening on the upper surface side is not limited to the large opening 63D depicted in FIG. 17A, and the opening can be provided in various modes, as described using FIGS. 11A, 11B, and 11C, for example.

It is to be noted, however, that in order that the circuit board accommodated in the board protecting pipe can be held, it is preferable that a part is present which has a side wall over an angular range of not less than 180 degrees with the axis as a center. More preferably, it is sufficient to adopt a configuration wherein both long sides of that surface of the circuit board accommodated in the board protecting pipe which faces the side opening make contact with the inner wall of the board protecting pipe and do not come out to the exterior. In other words, it is sufficient to adopt a configuration wherein the side opening provided in the board protecting pipe is smaller than that surface of the circuit board which faces the side opening. Note that for maintaining the strength of the board protecting pipe 6, it is preferable to adopt a configuration wherein a part is absent which has a side wall over an angular range of less than 180 degrees with the axis as a center.

In addition, naturally, various electronic parts other than the aforementioned electronic parts can be mounted on the circuit board 4.

Besides, as each of component parts constituting the electronic pen main body 8 or the like, those of appropriate sizes can be used, whereby an electronic pen main body section of an appropriate size can be configured.

Note that a variable capacitor whose capacitance is varied according to the pen pressure by a mechanical movable part has been used for the pressure-sensing part of the pen pressure detector 31 in the embodiment described above, this is not restrictive. A variable capacitor configured as a micro electro mechanical system (MEMS) chip including a semiconductor device may also be used. In addition, naturally, the pressure-sensing part may not be one that detects variation in capacitance but be one wherein inductance value or resistance value is variable.

DESCRIPTION OF REFERENCE SYMBOLS

1 ... Core body, 2 ... Coil section, 3 ... Connection section, 31 ... Pen pressure detector, 32 ... Fitting section, 33 ... Connection terminal section, 33a, 33b ... Connection terminal, 4 ... Circuit board, 41a, 41b ... Terminal, 42 ... IC (control circuit), 43 ... Side switch, 44 to 49 ... Capacitor, 5 ... Board receiving base, 6, 6A, 6B, 6C, 6D ... Board protecting pipe, 61 ... Core body side opening, 61a ... Core body side fitting section, 62 ... Rear end side opening, 62a ... Rear end side fitting section, 63, 63A, 63B, 63C, 63D ... Opening, 7 ... Pipe cap, 8 ... Electronic pen main body section, 9 ... Electronic pen cartridge, 10 ... Electronic pen, 11 ... Case, 12 ... Casing cap, 70 ... Switch terminal member, 70a, 70b ... Connection member, 41c, 41d ... Terminal, 114, 114' ... Sliding member, 114A ... Rod-shaped body, 114B, 114C ... Pusher member, 401a ... Main body section, 401b, 401c ... Metal member, 3A ... Connection section, 31A ... Pen pressure detector, 32A ... Fitting section, 33A ... Connection terminal section, 33c ... Coil connection section, C1, C2 ... Connection end

The invention claimed is:

1. An electronic pen comprising:
a circuit board;
an electronic part mounted on the circuit board;
a rigid tubular member that includes a side wall extending over an angular range of at least 180 degrees with an axis of the rigid tubular member as a center, wherein the side wall of the rigid tubular member forms an opening that extends over an angular range of less than 180 degrees with the axis of the rigid tubular member as the center, and wherein the circuit board is disposed within the rigid tubular member with the electronic part adjacent to the opening formed by the side wall of the rigid tubular member;
a pressure detector that is not surrounded by the rigid tubular member in a state in which the circuit board is surrounded by the rigid tubular member, the pressure detector being electrically connected to the circuit board surrounded by the rigid tubular member; and
a casing that is different from the rigid tubular member, wherein the rigid tubular member is disposed within the casing with the circuit board disposed within the rigid tubular member.

2. The electronic pen according to claim 1, further comprising:
a connection member that includes a portion at an end of the connection member,
wherein the circuit board is fixed at the end of the connection member by the portion at the end of the of the connection member that is in contact with and coupled to the circuit board.

3. The electronic pen according to claim 1, further comprising:
a connection member that includes a portion at an end of the connection member,
wherein the portion at the end of the connection member includes a first portion at a first end of the connection member and a second portion at a second end of the connection member,
wherein the first portion at the first end of the connection member is in contact with the second portion at the second end of the connection member, and the second portion at the second end of the connection member extends from the first portion at the first end of the connection member,
wherein the rigid tubular member is in contact with and coupled to the first portion at the first end of the connection member, and
wherein the circuit board is fixed at the second end of the connection member by the second portion at the second end of the connection member that is in contact with and coupled to the circuit board.

4. The electronic pen according to claim 1, further comprising:
a connection member that includes a portion at an end of the connection member,
wherein the rigid tubular member is provided with a cutout in a fitting portion that fits to the connection member.

5. The electronic pen according to claim 1,
wherein a side opening of the rigid tubular member is provided continuously from a first end in an axial direction of the rigid tubular member to a second end in the axial direction of the rigid tubular member.

6. The electronic pen according to claim 1,
wherein the rigid tubular member has a side wall over an angular range of not less than 180 degrees, with an axis thereof as a center, even in a site of a side opening of the rigid tubular member.

7. The electronic pen according to claim 1, further comprising:
a board receiving section that is located between the rigid tubular member and the circuit board accommodated in the rigid tubular member, and that pushes the circuit board and clamps the circuit board between itself and the rigid tubular member.

8. The electronic pen according to claim 1,
wherein the rigid tubular member is formed of any one of a metal, a carbon material, and a synthetic resin.

9. The electronic pen according to claim 1, further comprising:
a connection member that includes a portion at an end of the connection member,
wherein the connection member includes a pen pressure detector.

10. The electronic pen according to claim 1, further comprising:
a core body protruding through an opening in the casing to outside of the casing,
wherein a signal-transmitting or signal-transmitting-and-receiving coil is provided around the core body.

11. The electronic pen according to claim 1, further comprising:
a connection member that includes a portion at an end of the connection member, wherein:
the circuit board includes a switch terminal section provided with at least two contacts, at an end thereof opposite to a side where the circuit board is held by the connection member,
the electronic pen further comprises:
a connection terminal section that moves within the casing according to a user's operation, and that switches between a state in which the two contacts of the switch terminal section of the circuit board are electrically connected to each other and a state in which the two contacts are not electrically connected to each other.

12. The electronic pen according to claim 1, wherein the electronic pen is configured in a same shape as a refill to be accommodated in a ball-point pen casing.

13. The electronic pen according to claim 1, wherein the electronic pen is configured in a same shape as a refill to be accommodated in a multi-functional pen casing.

14. The electronic pen according to claim 1, further comprising:
a connection member that includes a portion at an end of the connection member,
wherein the rigid tubular member has a side opening that enables an operation to be performed on the circuit board disposed within the rigid tubular member and held at a second end of the connection member by the portion of the connection member that is in contact with and coupled to the circuit board.

15. The electronic pen according to claim 1, further comprising:
a connection member that includes a portion at an end of the connection member,
wherein the portion at the end of the connection member includes a first portion at a first end of the connection member and a second portion at a second end of the connection member, and
wherein the first portion and the second portion of the connection member are in contact with opposite sides of a portion of the circuit board at one end of the circuit board in an axial direction of the circuit board.

16. The electronic pen according to claim 1, further comprising:
a connection member that includes a portion at an end of the connection member,
wherein the portion at the end of the connection member includes a first portion at a first end of the connection member and a second portion at a second end of the connection member, and
wherein the first portion of the connection member surrounds a portion of the circuit board at one end of the circuit board in an axial direction of the circuit board.

17. The electronic pen according to claim 1, further comprising:
a connection member that includes a portion at an end of the connection member,
wherein the portion at the end of the connection member includes a first portion at a first end of the connection member and a second portion at a second end of the connection member, and
wherein the second portion of the connection member includes a pair of plate portions that extend from the first portion of the connection member, and a portion of the circuit board is sandwiched between the plate portions.

18. The electronic pen according to claim 17, further comprising:
a connection member that includes a portion at an end of the connection member; and
a pair of terminals on a portion of the circuit board at one end of the circuit board in an axial direction of the circuit board; and
two terminals interposed between the plate portions,
wherein, while the portion of the circuit board is sandwiched between the plate portions, the two terminals interposed between the plate portions are in contact with the pair of terminals on the circuit board.

19. The electronic pen according to claim 1, further comprising:
a connection member that includes a portion at an end of the connection member,
wherein the portion at the end of the connection member includes a first portion at a first end of the connection member and a second portion at a second end of the connection member, and
wherein an outer diameter of the first portion is greater than an outer diameter of the second portion.

20. The electronic pen according to claim 1, wherein the rigid tubular member has a cylindrical shape.

21. The electronic pen according to claim 1, further comprising:
a connection member that includes a portion at an end of the connection member; and
a core body including a first end portion that protrudes through an opening in the casing to outside of the casing and a second end portion opposite to the first end portion,
wherein the connection member holds the second end portion of the core body.

\* \* \* \* \*